(12) United States Patent
Nakaishi

(10) Patent No.: US 8,189,669 B2
(45) Date of Patent: May 29, 2012

(54) MOTION PREDICTION PROCESSOR WITH READ BUFFERS PROVIDING REFERENCE MOTION VECTORS FOR DIRECT MODE CODING

(75) Inventor: Hidenori Nakaishi, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1348 days.

(21) Appl. No.: 11/826,867

(22) Filed: Jul. 19, 2007

(65) Prior Publication Data

US 2008/0043845 A1 Feb. 21, 2008

(30) Foreign Application Priority Data

Aug. 17, 2006 (JP) ................................. 2006-222394

(51) Int. Cl.
*H04N 7/26* (2006.01)
(52) U.S. Cl. .................................. 375/240.16
(58) Field of Classification Search ............. 375/240.16
See application file for complete search history.

(56) References Cited

U.S. PATENT DOCUMENTS

| 6,157,676 A * | 12/2000 | Takaoka et al. ........... 375/240.13 |
| 2005/0053297 A1 * | 3/2005 | Mukerjee et al. .............. 382/236 |
| 2006/0140275 A1 | 6/2006 | Lee et al. |

FOREIGN PATENT DOCUMENTS

| JP | 2004-048552 A | 2/2004 |
| JP | 2004-179810 A | 6/2004 |
| JP | 2006-166459 A | 6/2006 |

* cited by examiner

*Primary Examiner* — Jung Kim
*Assistant Examiner* — Ayoub Alata
(74) *Attorney, Agent, or Firm* — Arent Fox LLP

(57) ABSTRACT

A motion prediction processor that enables wider use of direct-mode motion prediction, with a reduced processing load. A motion prediction process makes reference to a reference picture to calculate motion vectors for a current picture. A write controller writes motion vectors of multiple block lines of the reference picture in memory areas corresponding to the block lines. A read controller transfers the stored motion vectors from each memory area to at least one of two buffers. The read controller determines how to transfer those motion vectors according to whether the current picture is a frame picture or a field picture, whether the reference picture is a frame picture or a field picture, and whether block adaptive prediction mode is specified in each picture.

14 Claims, 35 Drawing Sheets

FIG. 6C

Coding Type: MBAFF

LINE_SIZE × 2

| MB_POS=(X,0)<br>MB_POS=(X,1) | MB_POS=(X,2)<br>MB_POS=(X,3) | MB_POS=(X,4)<br>MP_POS=(X,5) | MB_POS=(X,6)<br>MP_POS=(X,7) | ... | MB_POS=(X,64)<br>MB_POS=(X,65) | MB_POS=(X,66)<br>MB_POS=(X,67) |

FIG. 6B

Coding Type: FLD

LINE_SIZE

| MB_POS=(X,0)<br>FLD(Top) | MB_POS=(X,0)<br>FLD(Bottom) | MB_POS=(X,1)<br>FLD(Top) | MB_POS=(X,1)<br>FLD(Bottom) | MB_POS=(X,2)<br>FLD(Top) | MB_POS=(X,2)<br>FLD(Bottom) | MB_POS=(X,3)<br>FLD(Top) | MB_POS=(X,3)<br>FLD(Bottom) | ... | MB_POS=(X,66)<br>FLD(Top) | MB_POS=(X,66)<br>FLD(Bottom) | MB_POS=(X,67)<br>FLD(Top) | MB_POS=(X,67)<br>FLD(Bottom) |

FIG. 6A

Coding Type: FRM

LINE_SIZE

| MB_POS=(X,0) | MB_POS=(X,1) | MB_POS=(X,2) | MB_POS=(X,3) | ..... | MB_POS=(X,66) | MB_POS=(X,67) |

Address 0x00000  0x00440  0x00880  0x00CC0  0x11880  0x11CC0  0x120FF

FIG. 7

381 READ MODE DECISION TABLE

| CURRENT PICTURE TYPE | | REFERENCE PICTURE TYPE | | READ MODE | INTERNAL BUFFER | MBColMODE |
|---|---|---|---|---|---|---|
| FLD | — | FLD | — | 0 | 1 | 1 |
| | — | FRM | — | 1 | 2 | 4 |
| | — | MBAFF | frm | 2 | 1 | 4 |
| | — | | fld | 2 | 1 | 1 |
| FRM | — | FLD | — | 3 | 1 | 2 or 3 |
| | — | FRM | — | 4 | 1 | 0 |
| MBAFF | frm | FLD | — | 5 | 2 | 2 or 3 |
| | fld | | | 5 | 2 | 1 |
| | frm | MBAFF | frm | 6 | 1 | 1 |
| | | | fld | 6 | 1 | 2 or 3 |
| | fld | | frm | 6 | 1 | 4 |
| | | | fld | 6 | 1 | 1 |

FIG. 8A

MBColMode=0:   CurrMB=frm(FRM), MBCol=frm(FRM)

(CurrMB)

| 0 | 1 | 4 | 5 |
|---|---|---|---|
| 2 | 3 | 6 | 7 |
| 8 | 9 | 12 | 13 |
| 10 | 11 | 14 | 15 |

(MBCol)

| 0 | 1 | 4 | 5 |
|---|---|---|---|
| 2 | 3 | 6 | 7 |
| 8 | 9 | 12 | 13 |
| 10 | 11 | 14 | 15 |

FIG. 8B

MBColMode=1: CurrMB=frm(MBAFF), MBCol=frm(MBAFF)
        or   CurrMB=fld,  MBCol=fld

(CurrMB)

501 — 502
| 0 | 5 |
|---|---|
| 10 | 15 |
503 — 504

(MBCol)

505 — 506
| 0 |   |   | 5 |
|---|---|---|---|
|   |   |   |   |
|   |   |   |   |
| 10 |   |   | 15 |
507 — 508

MBColMode=2: CurrMB=frm(odd), MBCol=fld(FLD)

MBColMode=3: CurrMB=frm(even), MBCol=fld(FLD)

MBColMode=4: CurrMB=fld, MBCol=frm

READ MODE 0: Current Picture(FLD) - Ref Picture(FLD(TOP))

READ MODE 1: Current Picture(FLD) - Ref Picture(FRM)

READ MODE 2: Current Picture(FLD) - Ref Picture(MBAFF)

READ MODE 3: Current Picture(FRM) - Ref Picture(FLD)

READ MODE 4: Current Picture(FRM) - Ref Picture(FRM)

READ MODE 5: Current Picture(MBAFF) - Ref Picture(FLD)

READ MODE 6: Current Picture(MBAFF) - Ref Picture(MBAFF)

FIG. 13  READ MODE 0
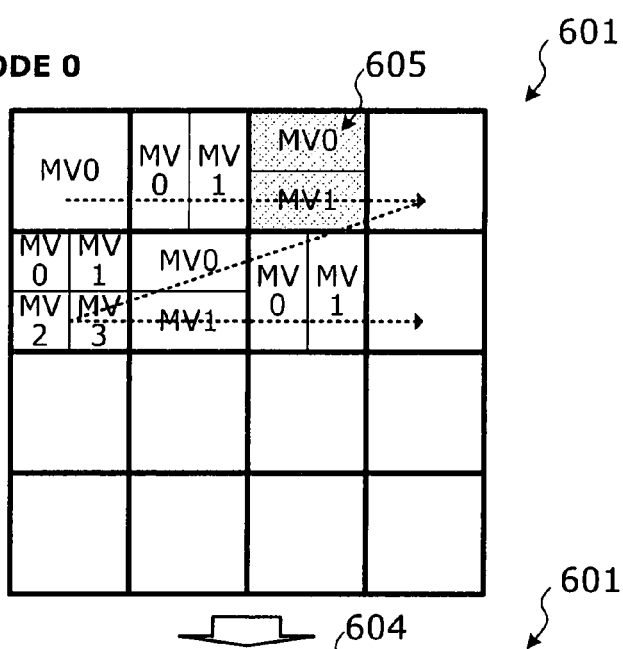
CO-LOCATED MACROBLOCK
WRITE ORDER
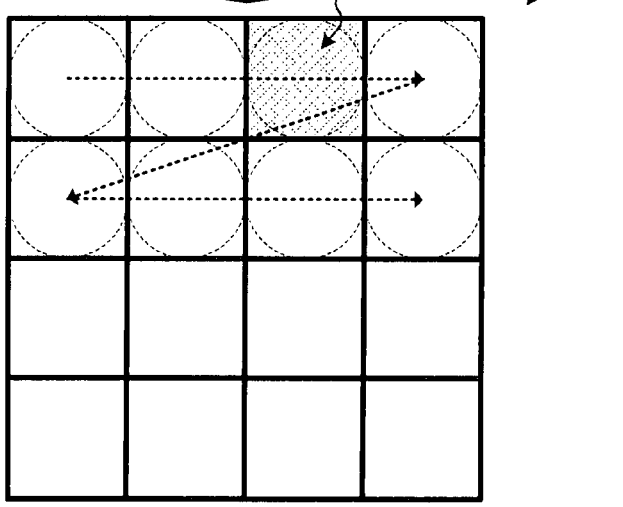
CO-LOCATED MACROBLOCK
READ ORDER
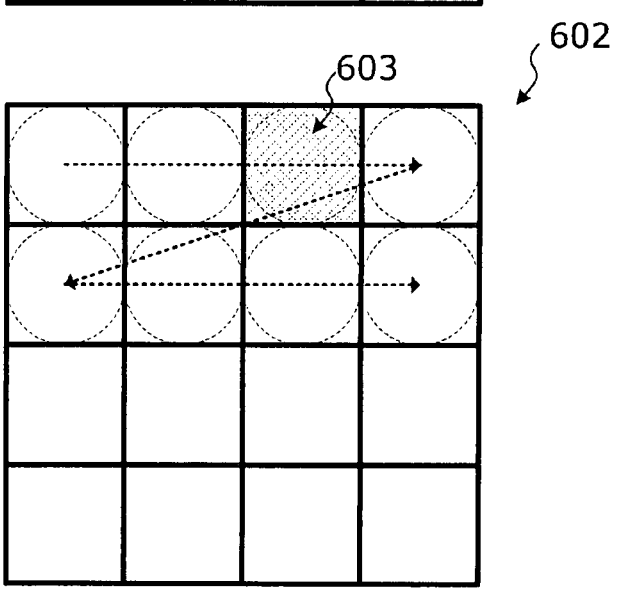
CURRENT MACROBLOCK
PROCESSING ORDER

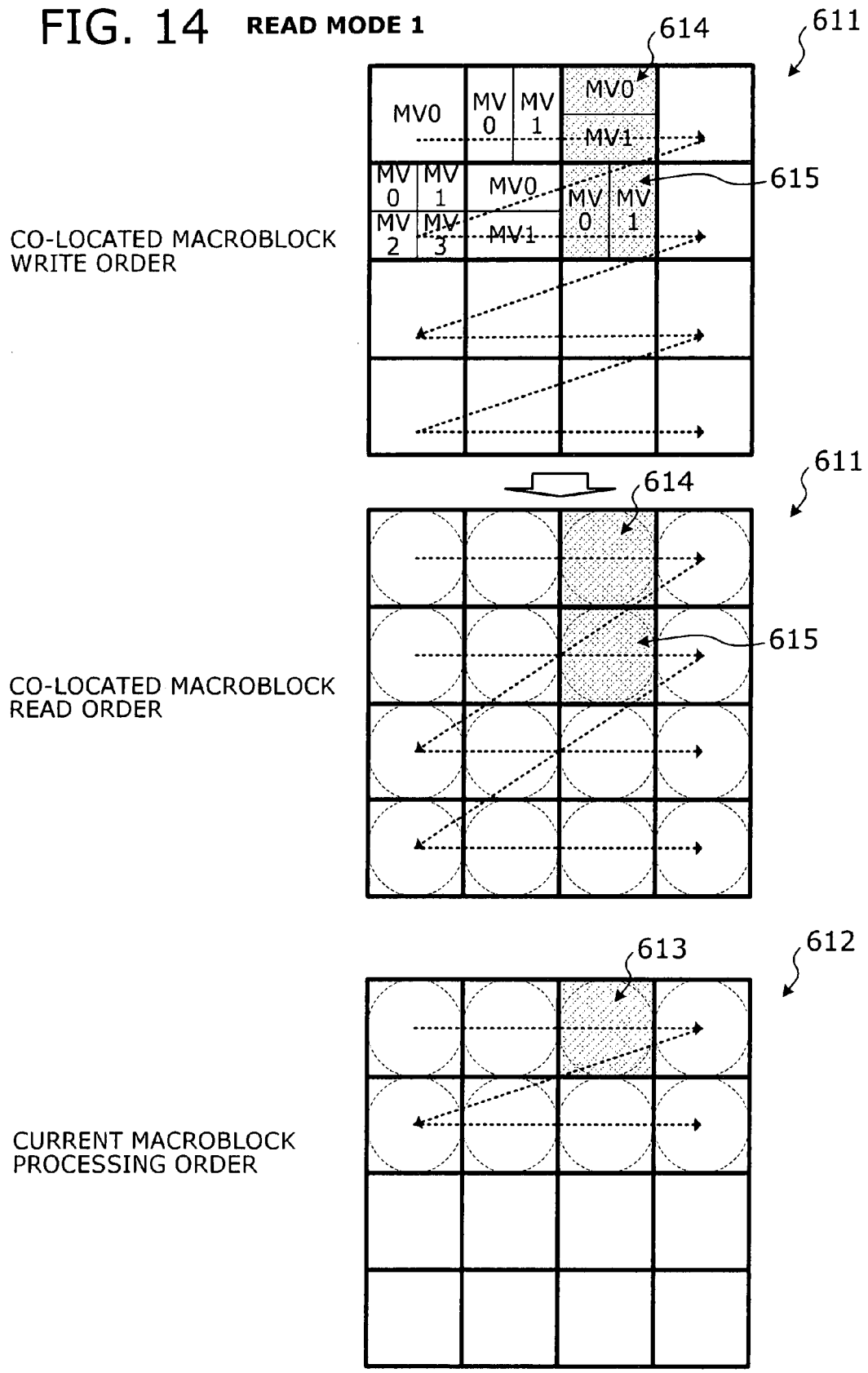
FIG. 14 READ MODE 1
CO-LOCATED MACROBLOCK WRITE ORDER
CO-LOCATED MACROBLOCK READ ORDER
CURRENT MACROBLOCK PROCESSING ORDER

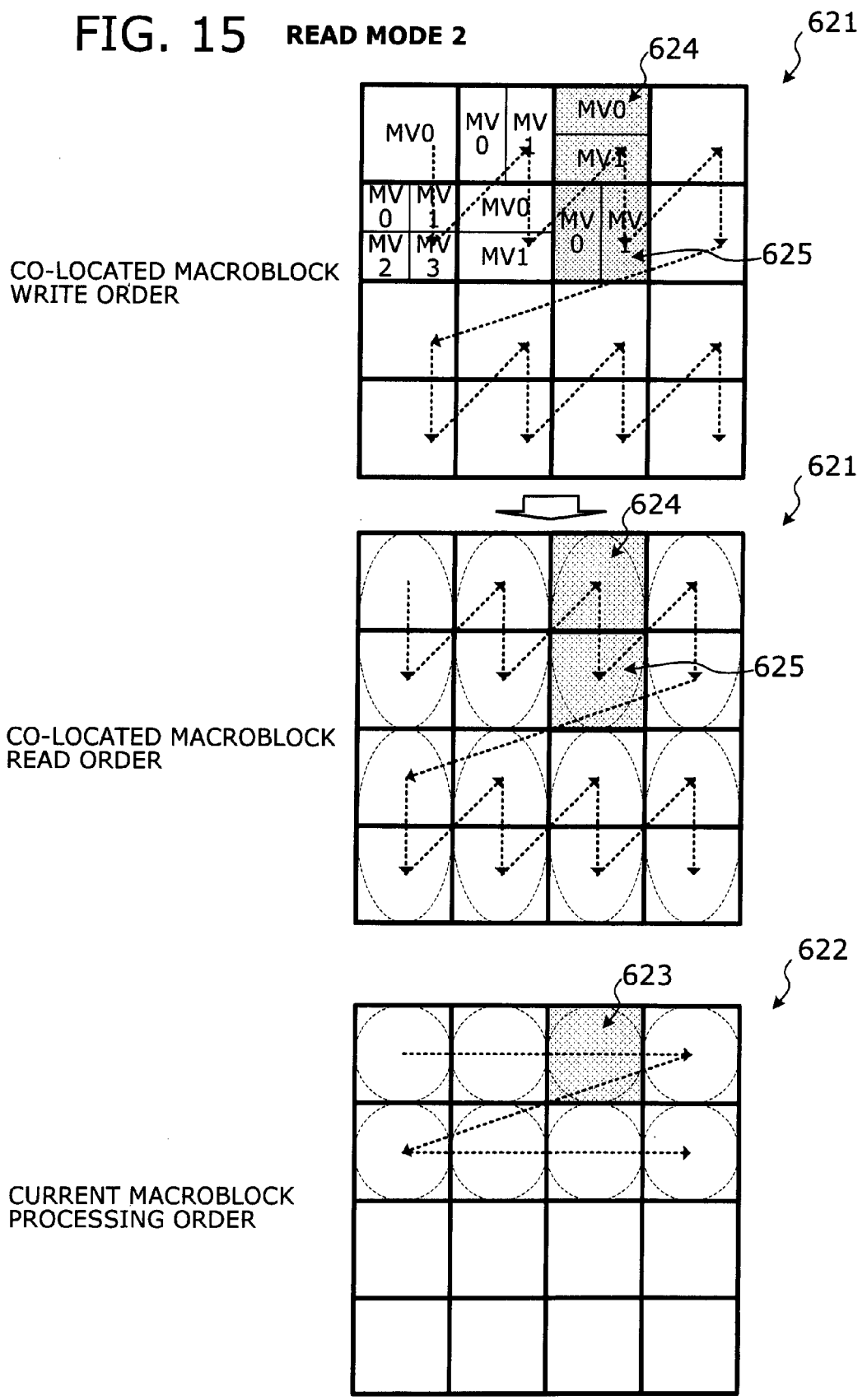
FIG. 15 READ MODE 2

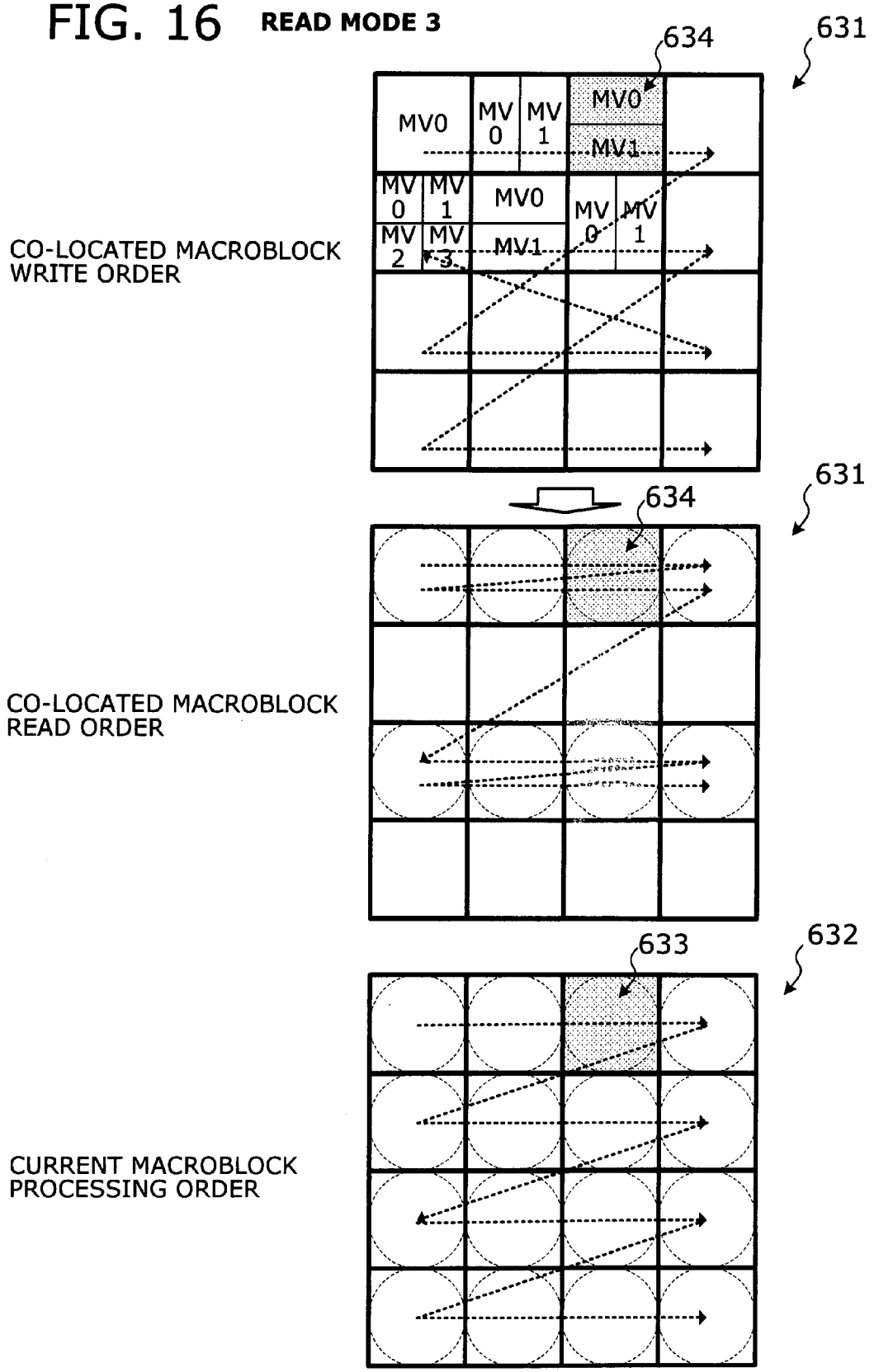
FIG. 16 READ MODE 3

FIG. 17  READ MODE 4
CO-LOCATED MACROBLOCK WRITE ORDER
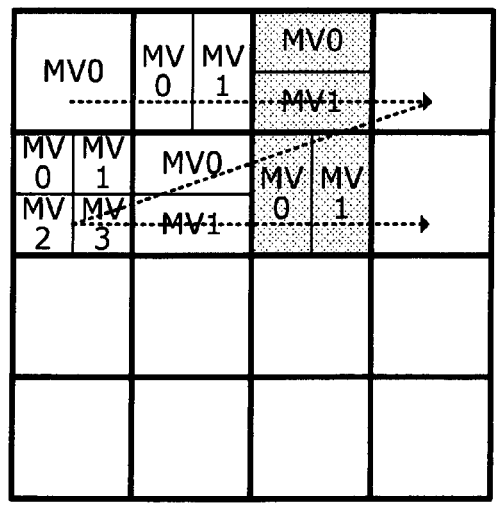
CO-LOCATED MACROBLOCK READ ORDER
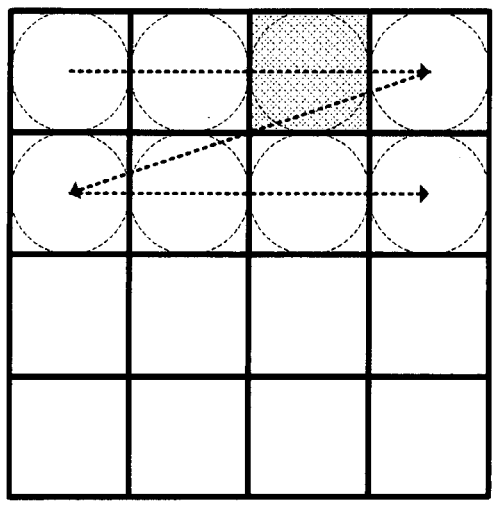
CURRENT MACROBLOCK PROCESSING ORDER
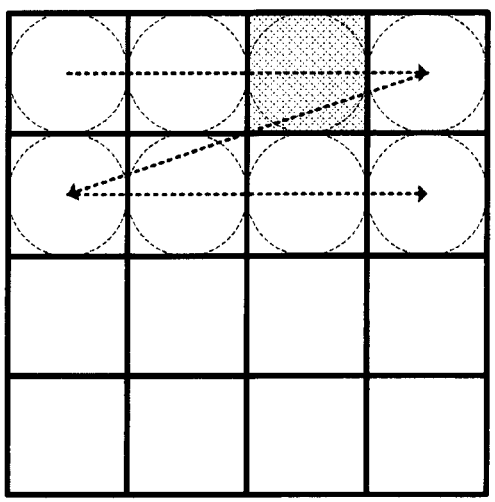

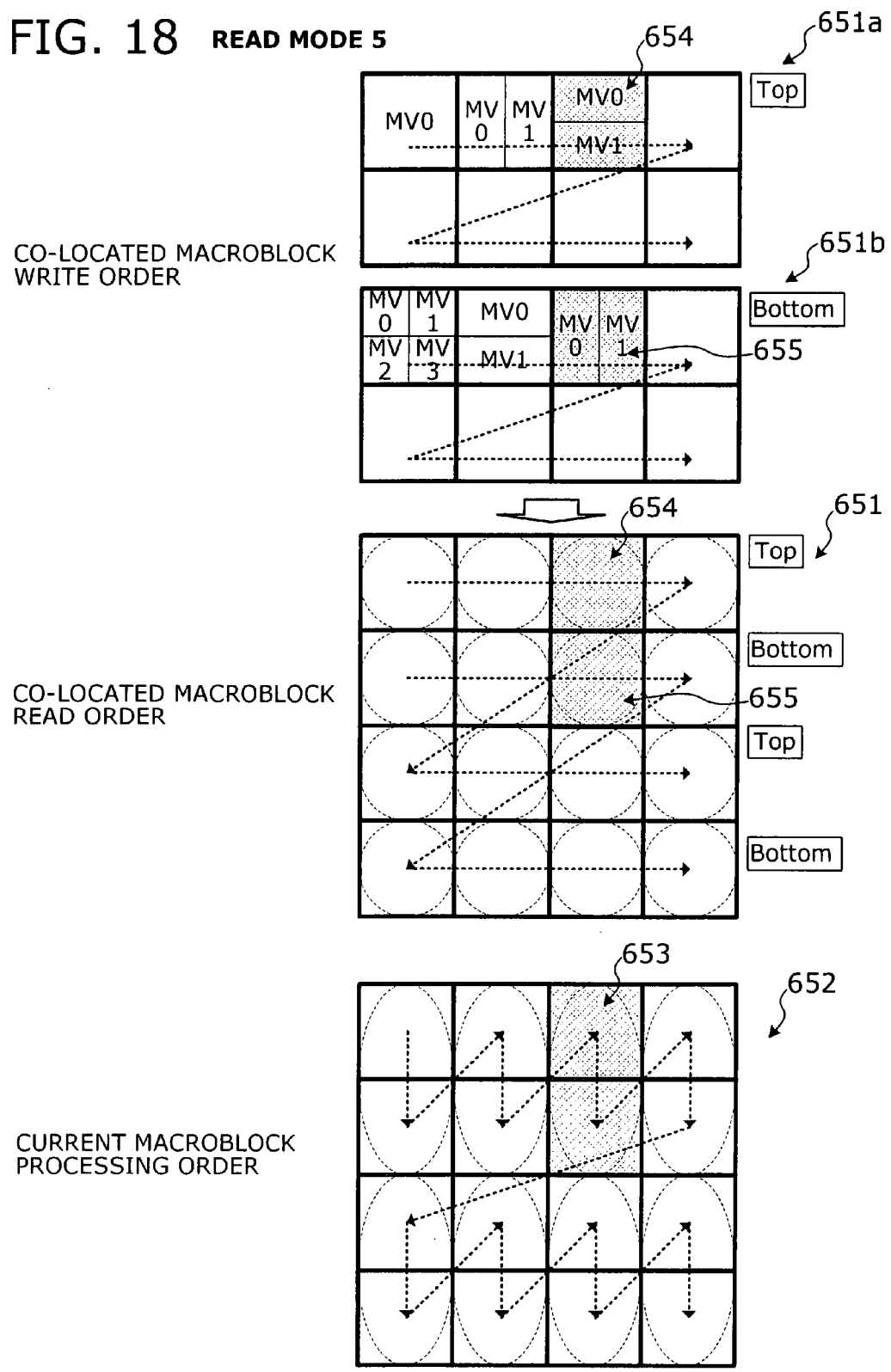
FIG. 18 READ MODE 5
CO-LOCATED MACROBLOCK WRITE ORDER
CO-LOCATED MACROBLOCK READ ORDER
CURRENT MACROBLOCK PROCESSING ORDER

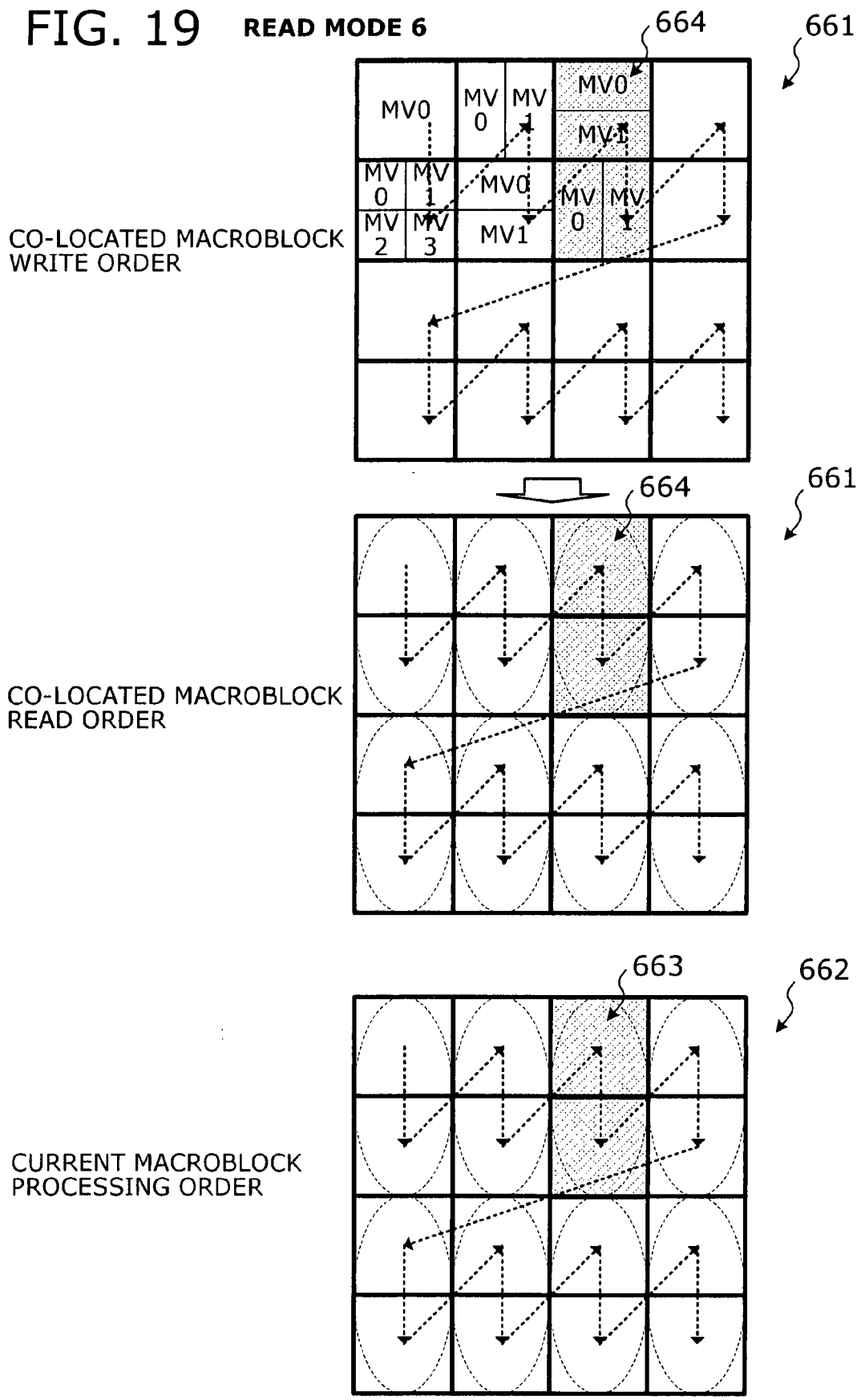
FIG. 19 READ MODE 6

FIG. 28

382 MACROBLOCK TYPE LOOKUP TABLE

| MBColMode | CURRENT MACROBLOCK | CO-LOCATED MACROBLOCK | MBCol_MBTYPE | CurrMB_MBTYPE | CONSOLIDATE |
|---|---|---|---|---|---|
| 0 | frm | frm | MBCol_MBTYPE | MBCol_MBTYPE | |
| 1 | fld | fld | 8x8 (With sub-MB) | 8x8 | YES |
| | | | Other than above | MBCol_MBTYPE | |
| 2 | frm (odd-numbered lines) | fld | 16x16 | 16x16 | |
| | | | 16x8 | 16x16 | YES |
| | | | 8x16 | 8x16 | |
| | | | 8x8 (no sub-MB) | 8x16 | YES |
| | | | Other than above | 8x8 | YES |
| 3 | frm (even-numbered lines) | fld | 16x16 | 16x16 | YES |
| | | | 16x8 | 16x16 | |
| | | | 8x16 | 8x16 | |
| | | | 8x8 (no sub-MB) | 8x16 | YES |
| | | | Other than above | 8x8 | YES |
| 4 | fld | frm | (Upper MBCol=16x16 or 16x8) and (Lower MBCol=16x16 or 16x8) | 16x8 | |
| | | | Other than above | 8x8 | YES |

MBColMode=0: CurrMB=frm(FRM), MBCol=frm(FRM)

FIG. 30  MBColMode=1: CurrMB=frm(MBAFF), MBCol=frm(MBAFF) or CurrMB=fld, MBCol=fld
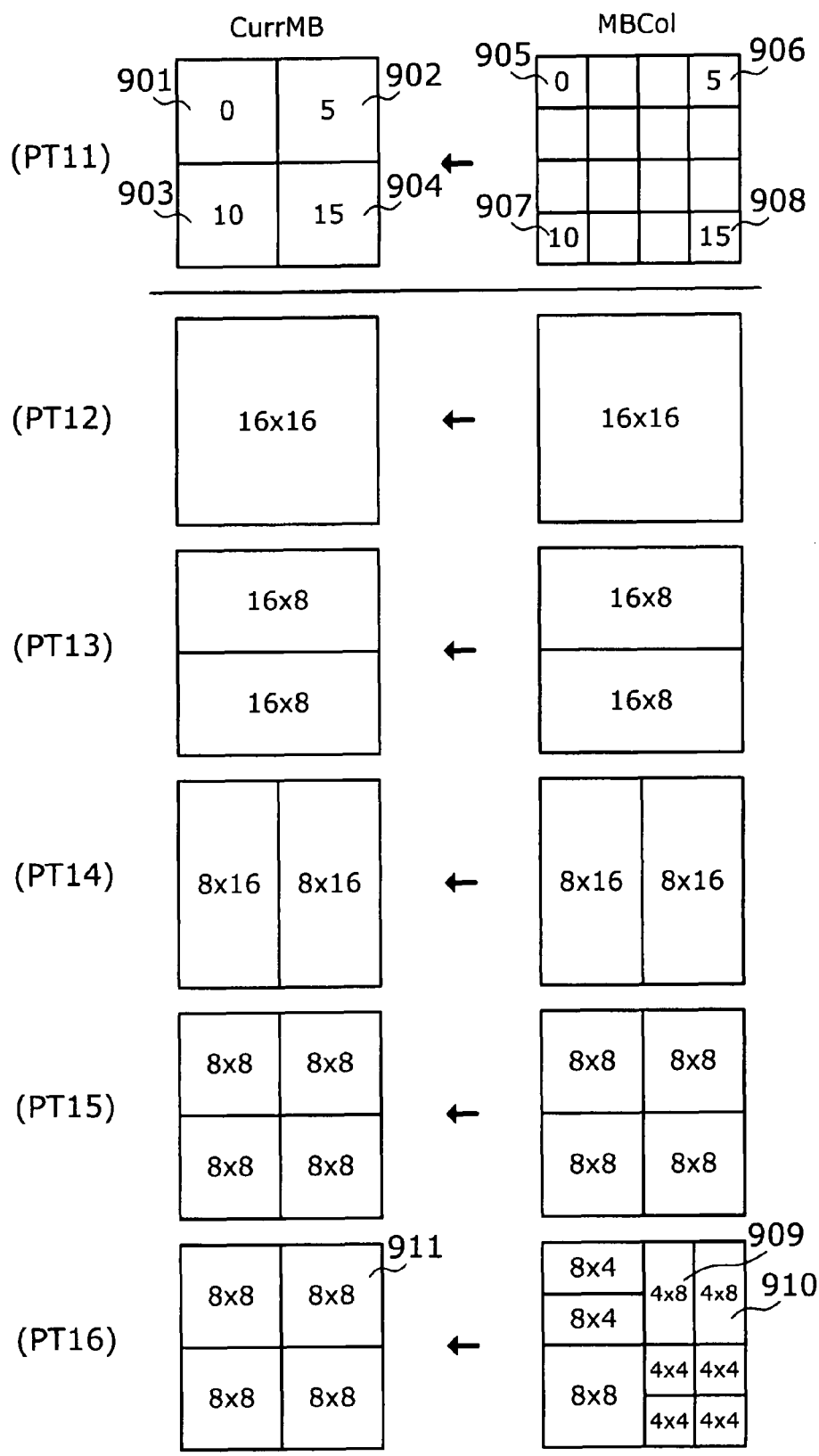

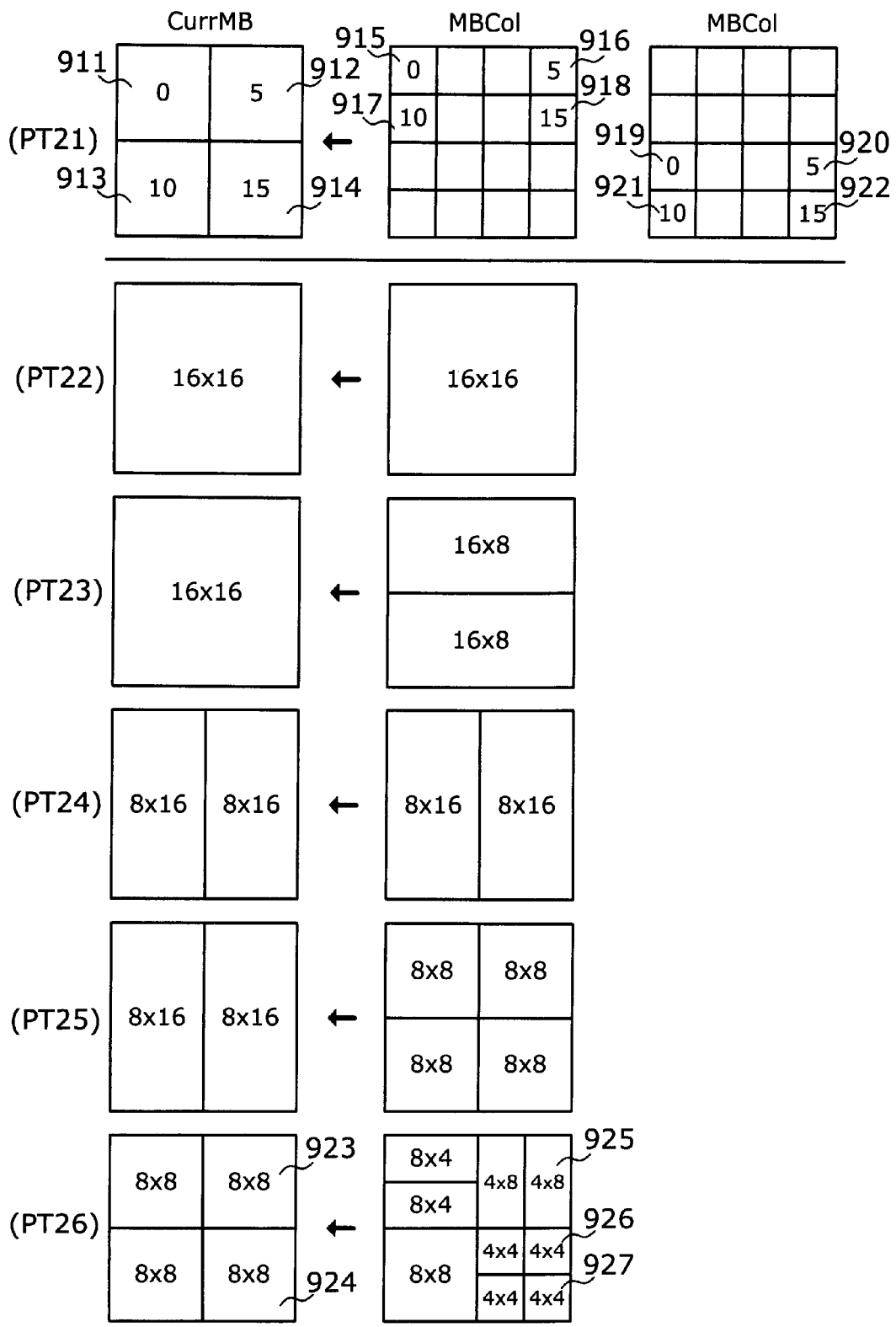
FIG. 31  MBColMode=2: CurrMB=frm(ODD), MBCol=fld(FLD)
MBColMode=3: CurrMB=frm(EVEN), MBCol=fld(FLD)

FIG. 32  MBColMode=4: CurrMB=fld, MBCol=frm
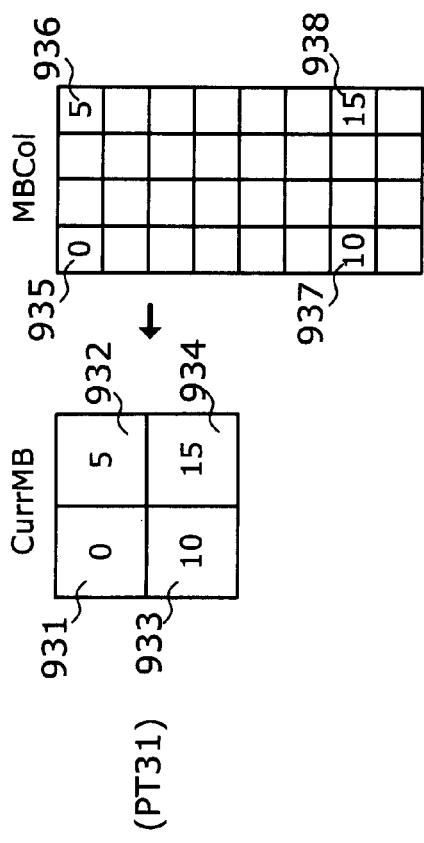
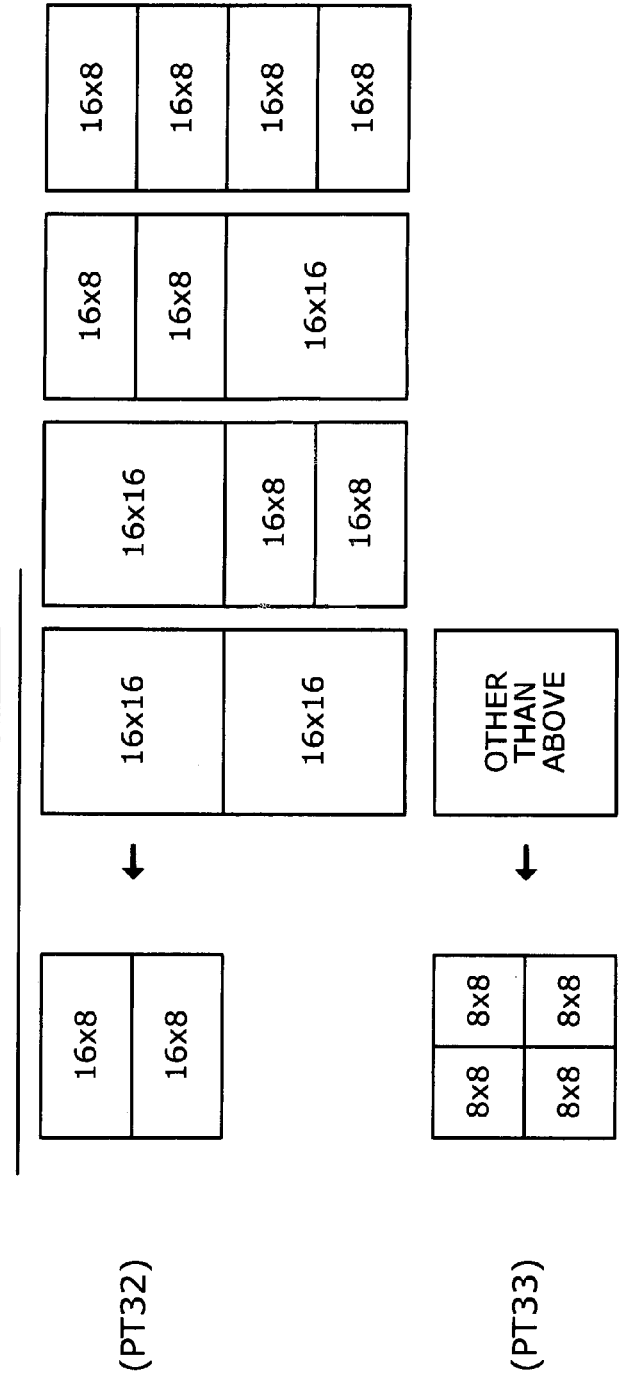
(PT31)
(PT32)
(PT33)

MOTION PREDICTION PROCESSOR WITH READ BUFFERS PROVIDING REFERENCE MOTION VECTORS FOR DIRECT MODE CODING

CROSS-REFERENCE TO RELATED APPLICATIONS

This application is based upon and claims the benefits of priority from the prior Japanese Patent Application No. 2006-222394 filed on Aug. 17, 2006, the entire contents of which are incorporated herein by reference.

BACKGROUND OF THE INVENTION

1. Field of the Invention

The present invention relates to a device that performs interframe prediction of video frames on a block basis, as well as to video coding and decoding devices using the same. More particularly, the present invention relates to an interframe prediction processor, a video coding device, and a video decoding device adapted to an operation mode in which motion vectors for a current block is calculated directly from previously calculated motion vectors of a co-located block in a reference picture.

2. Description of the Related Art

Digital video compression techniques are widely used in many applications. MPEG and H.264 are among the standard specifications in this technical field, where MPEG stands for "Moving Picture Expert Group." The coding and decoding algorithms used in those standards divide each given picture into small areas and process them with motion compensation techniques. Such picture areas are called "macroblocks." A video coding process involves intraframe prediction and interframe prediction. The intraframe prediction reduces redundancy within a single frame by using orthogonal transform, quantization, and other data compression algorithms. The interframe prediction, on the other hand, reduces redundancy between successive frames by extracting and encoding motion compensation residual (i.e., the difference between a current frame and a motion-compensated reference frame). The resulting video data is then entropy-coded for transmission or storage. A video decoding process reverses the above steps to reconstruct original video from compressed video.

Some standard coding algorithms including MPEG-2 and H.264 adaptively select a frame-based coding mode or a field-based coding mode to process interlaced video signals. These algorithms further permit switching between interframe prediction and interfield prediction for each two vertically adjacent macroblocks (or "macroblock pair") for motion vector calculation. This coding mode is called "macroblock adaptive field/frame" (MBAFF) mode. Which of those three modes to use can be specified by a "coding type" parameter on an individual picture basis. In this description, the three coding modes will be referred to as "FRM" (frame), "FLD" (field), and "MBAFF" modes.

FIG. 33 explains the order of macroblocks to be processed for each different coding type. The topmost part of FIG. 33 shows in what order the coding process selects 16×16-pixel macroblocks constituting a picture. Specifically, the top-left part of FIG. 33 depicts the case of FRM coding type, in which mode the macroblocks of 16×16 pixels constituting a frame are processed from left to right and top to bottom. This means that odd-numbered lines and even-numbered lines are selected alternately for processing. The top-middle part of FIG. 33 shows the case of "FLD" coding type, in which mode the video data is processed as two separate fields, i.e., top field and bottom field. The coding process begins with a top field (or odd-numbered lines) and then proceeds to a bottom field (or even-numbered lines) in the subsequent field synchronization period, as shown in the bottom-middle part of FIG. 33.

The top-right corner of FIG. 33 shows the case of MBAFF coding type, in which a frame is processed on a macroblock pair basis. The processing order of field lines depends on whether the macroblock pair of interest is to be interframe coded or interfield coded. In the case of interframe-coded macroblock pairs (hereafter "frame pairs"), odd-numbered lines and even-numbered lines are processed alternately as illustrated in the bottom-right part of FIG. 33. In the case of interfield-coded macroblock pairs (hereafter "field pairs"), odd-numbered lines are processed before even-numbered lines since the first and second macroblocks of such pairs correspond to top field data and bottom field data, respectively.

To improve the accuracy of motion vector prediction for macroblocks containing edges and outlines, some existing coding algorithms split up such macroblocks into smaller blocks and calculate a motion vector for each block. For example, H.264 supports macroblock partitioning that divides a basic macroblock with a size of 16×16 pixels into various block sizes as necessary, including minimum sub-partitions of 4×4 pixels.

FIGS. 34A to 34E show various sizes of macroblocks and sub-macroblocks defined in H.264. Shown in FIG. 34A is a basic macroblock with a size of 16×16 pixels. Where appropriate in this specification, the size of a block is designated as a prefix representing width by height (as in "16×16 macroblock").

The 16×16 basic macroblock of FIG. 34A may be vertically partitioned into two 16×8 macroblocks 12 (FIG. 34B), or horizontally partitioned into two 8×16 macroblocks 13 (FIG. 34C), or partitioned in both ways into four 8×8 macroblocks 14 (FIG. 34D). As the dotted arrows indicate, the 16×8 macroblocks 12 are processed from top to bottom. The 8×16 macroblocks 13 are processed from left to right. The 8×8 macroblocks 14 are processed from top-left to top-right, then bottom-left to bottom-right.

H.264 further allows an 8×8 macroblock 14 to be divided into smaller partitions called "sub-macroblocks." The above-noted size prefix can also be applied to those sub-macroblocks. In the example shown in FIG. 34E, the top-right 8×8 macroblock is divided into two 8×4 sub-macroblocks, the bottom-left 8×8 macroblock is divided into two 4×8 sub-macroblocks, and the bottom-right 8×8 macroblock is divided into four 4×4 sub-macroblocks. Sub-macroblocks are supposed to be processed in the same order as in the macroblock partitions shown in FIGS. 34A to 34D.

The interframe prediction process in the above-described video coding system calculates motion vectors by comparing the current frame with past frames on a macroblock basis. The amount of coded data is reduced by only encoding the difference between motion vectors calculated from macroblock images of each frame and motion vectors predicted from those of surrounding blocks. To reduce the amount of coded data, the H.264 specification allows a video coding device to choose direct mode coding that calculates motion vectors for a current block based solely on the previously calculated motion vectors of the same block of another frame.

FIG. 35 shows the concept of motion vector calculation in direct mode. Direct mode coding may be applied to bidirectionally coded pictures (B pictures). In this mode, a motion vector is calculated for the current macroblock (CurrMB) in the current picture (CurrPic) directly from the motion vector of a macroblock at the same location (co-located macroblock, or MBCol) in a reference picture. Where appropriate, reference pictures may be referred to by the symbol "ColPic" which means a picture containing a co-located macroblock.

In direct mode, forward and backward motion vectors for the current macroblock are derived from a co-located motion vector that has previously been calculated for the co-located block in a reference picture subsequent to the current picture in display order. Specifically, the direct-mode vector calculation is achieved by scaling the co-located vector in accordance with temporal distances between the current and reference pictures.

The direct-mode vector calculation requires calculated motion vectors to be saved in a memory and read out later as reference vectors at co-located blocks. As mentioned above, however, pictures may be coded in different modes, and macroblocks may be partitioned in various ways. For this reason, it would be a complicated process to control memory read operations to read out motion vectors for direct-mode prediction. Particularly when MBAFF mode is allowed in addition to FRM and FLD modes, there will be a great many patterns of block sizes and block locations for both current and reference macroblocks. Such variety of combinations makes it extremely difficult to control vector read operations.

A technique to improve the efficiency of motion vector prediction in MBAFF mode is proposed in the Unexamined Japanese Patent Application Publication No. 2006-166459, paragraphs 0078 to 0092 and FIG. 10. According to this technique, the proposed device employs a top-side memory to store motion vectors of lower block group in an upper adjacent macroblock, as well as a left-side memory to store motion vectors of right block group in a left adjacent macroblock. The top-side memory provides individual banks for storing motion vectors for upper and lower portions of a macroblock pair. A predicted motion vector for the current block is calculated with reference to motion vectors stored in those memories.

As can be seen from the above, the implementation of direct mode with all the FRM, FLD, and MBAFF coding types requires complicated control of read operations for reference motion vectors, thus imposing heavy processing loads on the processor and introducing increased complexity into circuit design. The conventional approach to simplified direct mode processing is to partition a macroblock into minimum-size blocks (i.e., blocks with a size of 4×4 pixels) and store a motion vector for each and every such block. That is, the conventional method reserves and actually uses as many memory addresses as the number of minimum-size partitions, regardless of how the reference macroblock is actually partitioned. The resulting problem is that the coding and decoding process has to deal with a heavy processing load due to a large number of memory access cycles and an increased amount of computation for motion vector calculation. Another problem is that the coding process may experience poor video compression ratios because of an increased amount of coded data produced.

SUMMARY OF THE INVENTION

In view of the foregoing, it is an object of the present invention to provide a motion prediction processor that enables wider use of direct-mode motion prediction, with a reduced processing load. It is also an object of the present invention to provide video coding and decoding devices using such a motion prediction processor.

To accomplish the first object stated above, the present invention provides a motion prediction processor that performs interframe motion prediction on a basic block basis. This motion prediction processor is coupled to a vector memory providing a plurality of memory areas and to first and second buffers organized as first-in first-out data storage. The motion prediction processor includes, among others, the following elements: a write controller, a read controller, and a vector calculator. The write controller writes motion vectors of multiple block lines constituting a reference picture in the memory areas corresponding to the block lines for use in a motion prediction process for a current picture, wherein each block line is formed from a plurality of horizontally aligned basic blocks. The read controller transfers the stored motion vectors from each memory area of the vector memory to at least one of the first and second buffers. The way of doing this data transfer is determined from several parameters, which are: whether the current picture is a frame picture or a field picture, whether the reference picture is a frame picture or a field picture, and whether block adaptive prediction mode is specified or not. Here the block adaptive prediction mode refers to an operation mode which permits selection of frame prediction or field prediction for each basic block. The vector calculator calculates a motion vector for each basic block of the current picture, based on the motion vectors sequentially read out of the first and second buffers.

Also, to accomplish the second object stated above, the present invention provides a video coding device that encodes video signals into compressed video data by performing interframe motion prediction on a basic block basis. This video coding device includes, among others, the following elements: a vector memory, first and second buffers, a write controller, a read controller, and a vector calculator. The vector memory provides a plurality of memory areas. The first and second buffers are organized as first-in first-out data storage. The write controller writes motion vectors of multiple block lines constituting a reference picture in the memory areas corresponding to the block lines for use in a motion prediction process for a current picture, wherein each block line is formed from a plurality of horizontally aligned basic blocks. The read controller transfers the stored motion vectors from each memory area of the vector memory to at least one of the first and second buffers. The way of doing this data transfer is determined from several parameters, which are: whether the current picture is a frame picture or a field picture, whether the reference picture is a frame picture or a field picture, and whether block adaptive prediction mode is specified or not. Here the block adaptive prediction mode refers to an operation mode which permits selection of frame prediction or field prediction for each basic block. The vector calculator calculates a motion vector for each basic block of the current picture, based on the motion vectors sequentially read out of the first and second buffers.

Further, to accomplish the second object stated above, the present invention provides a video decoding device that reconstructs original video pictures from a compressed video signal that has been produced by performing interframe motion prediction on a basic block basis. This video decoding device includes, among others, the following elements: a vector memory, first and second buffers, a write controller, a read controller, and a vector calculator. The vector memory provides a plurality of memory areas. The first and second buffers are organized as first-in first-out data storage. The write controller writes motion vectors of multiple block lines constituting a reference picture in the memory areas corresponding to the block lines for use in a motion prediction process for a current picture, wherein each block line is formed from a plurality of horizontally aligned basic blocks. The read controller transfers the stored motion vectors from each memory area of the vector memory to at least one of the first and second buffers. The way of doing this data transfer is determined from several parameters, which are: whether the current picture is a frame picture or a field picture, whether the reference picture is a frame picture or a field picture, and whether block adaptive prediction mode is specified or not. Here the block adaptive prediction mode refers to an operation mode which permits selection of frame prediction or field prediction for each basic block. The vector calculator calculates a motion vector for each basic block of the current picture, based on the motion vectors sequentially read out of the first and second buffers.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 6A to 6C show how reference picture data is stored in an external memory.

FIG. 7 shows a read mode decision table.

FIGS. 8A, 8B, and 9A to 9C show the relationships between current and co-located blocks in various combinations of frame/field types.

FIG. 13 explains the order of macroblocks in read mode 0.
FIG. 14 explains the order of macroblocks in read mode 1.
FIG. 15 explains the order of macroblocks in read mode 2.
FIG. 16 explains the order of macroblocks in read mode 3.
FIG. 17 explains the order of macroblocks in read mode 4.
FIG. 18 explains the order of macroblocks in read mode 5.
FIG. 19 explains the order of macroblocks in read mode 6.

FIG. 28 shows a macroblock type lookup table.

FIG. 30 shows an example of current macroblock type for MBColMode=1.

FIG. 31 shows an example of current macroblock type for MBColMode=2 or =3.

FIG. 32 shows an example of current macroblock type for MBColMode=4.

DESCRIPTION OF THE PREFERRED EMBODIMENTS

Figure 1:
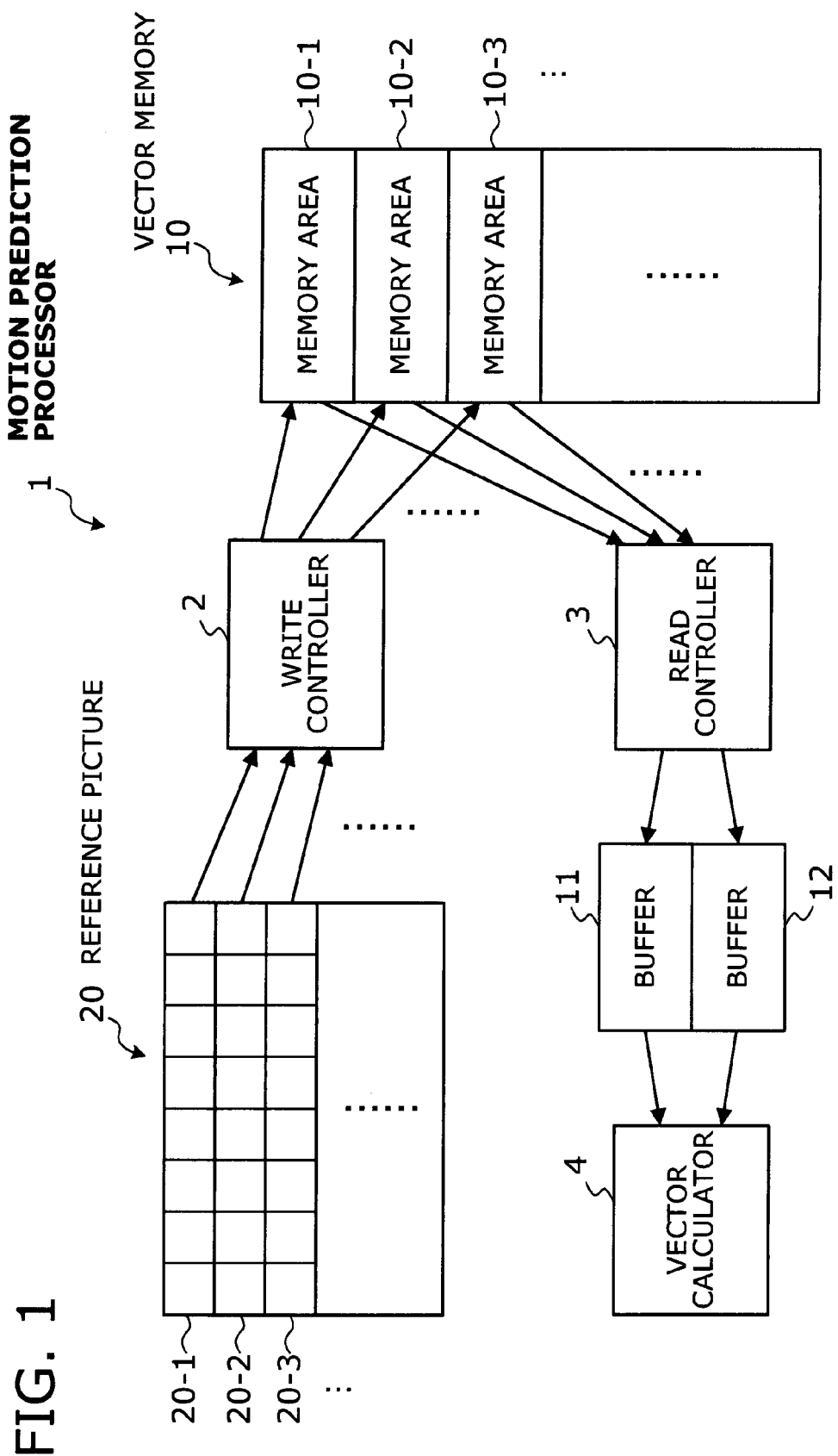
FIG. 1 is a block diagram of a motion prediction processor according to an embodiment of the present invention.

Preferred embodiments of the present invention will now be described in detail below with reference to the accompanying drawings, wherein like reference numerals refer to like elements throughout. The description begins with an overview of the present invention and then proceeds to a more specific embodiment of the invention. In the rest of this document, the size and shape of a block (i.e., picture partition) are indicated in the form of N×M, where N and M represent width and height, respectively. For example, the term "16×8 block" denotes a block of 16 pixels wide and 8 pixels high.

FIG. 1 is a block diagram of a motion prediction processor according to an embodiment of the present invention. The illustrated motion prediction processor 1 provides interframe motion estimation functions for use in a coding device that encodes video signals in compressed form, as well as in a video decoding device that reproduces original video signals from coded signals. The motion prediction processor 1 divides a video frame into fixed-size basic blocks, e.g., 16×16 blocks, to perform motion estimation on a block basis.

The motion prediction processor 1 is used to calculate a motion vector for each block of a current picture directly from motion vectors of a selected reference picture. This calculation is referred to as the direct mode prediction. According to the present embodiment, the motion prediction processor 1 includes a write controller 2, a read controller 3, and a vector calculator 4 to achieve the purpose. The motion prediction processor 1 also uses a vector memory 10 and two buffers 11 and 12 for direct mode processing. The vector memory 10 is divided into a plurality of memory areas 10-1, 10-2, 10-3, and so on, each area allowing sequential addressing for read and write access. The buffers 11 and 12 serve as first-in first-out (FIFO) data storage. The vector memory 10 and buffers 11 and 12 may be implemented as integral part of the motion prediction processor 1 or, alternatively, as separate components.

The write controller 2 writes motion vectors of multiple block lines 20-1, 20-2, 20-3, and so on constituting a reference picture 20 in corresponding memory areas 10-1, 10-2, 10-3, and so on for use in a subsequent motion prediction process motion prediction process for a current picture. Each block line of the reference picture 20 is formed from a plurality of horizontally aligned basic blocks. The write controller 2 writes reference motion vectors on a block line basis.

The read controller 3 transfers the stored motion vectors from each memory area 10-1, 10-2, 10-3, and so on to the two buffers 11 and 12. At that time, the read controller 3 determines how the data in the memory areas 10-1, 10-2, 10-3, and so on should be transferred to the buffers 11 and 12, depending on the following conditions: whether the current picture is a frame picture or a field picture, whether the reference picture 20 is a frame picture or a field picture, and whether the block adaptive prediction mode is used or not. Here, the term "block adaptive prediction mode" refers to an operation mode which permits selection of frame prediction or field prediction for each basic block, as in the MBAFF mode of H.264.

Using the motion vectors sequentially read out of each buffer 11 and 12, the vector calculator 4 predicts motion vectors for each basic block of the current picture, thus performing direct-mode motion vector calculation.

The read controller 3 has to handle a good many patterns of picture types and conditions in the case where the direct mode and block adaptive prediction mode are combined. To simplify the control, the conventional method partitions blocks of a reference picture into sub-blocks with a minimum size (e.g., 4×4) and stores a motion vector for each and every instance of such sub-blocks in memory. This means that the memory stores more motion vectors than originally calculated for the reference picture 20, thus leading to an increased number of memory access cycles for direct mode calculation.

According to the proposed motion prediction processor 1, on the other hand, the vector memory 10 only stores as many motion vectors as originally calculated for the reference picture 20, without multiplying them for adaptation to minimum-size blocks. Also, the read and write operations to the vector memory 10 are performed on an individual block line basis. That is, the motion vectors corresponding to different block lines 20-1, 20-2, 20-3, and so on are stored in separate memory areas 10-1, 10-2, 10-3, and so on, so that a minimum required number of motion vectors can be read or written in a single memory access session with sequential addressing. The present embodiment thus minimizes the number of access cycles to the vector memory 10, alleviating processing loads of direct mode calculation. This also leads to an increased processing speed and a reduced power consumption.

The read controller 3 controls memory read cycles of the vector memory 10 to transfer motion vectors from each memory area 10-1, 10-2, 10-3, and so on to two buffers 11 and 12, depending on the coding mode of the current picture and reference picture 20 (i.e., whether they are frame pictures or field pictures), as well as on the use of block adaptive prediction mode. This mechanism of the read controller 3 ensures for the vector calculator 4 to receive required motion vectors in a required order from the buffers 11 and 12, according to various coding conditions of pictures and blocks. That is, the vector calculator 4 can obtain motion vectors of required basic block locations by simply reading out a sequence of vector data from the buffers 11 and 12, thus performing vector calculation with a minimum number of read operations.

The read controller 3 may employ some predefined tables to control data transfer operations from each memory area 10-1, 10-2, 10-3, and so on to the buffers 11 and 12 according to the above-described picture conditions. This table-based implementation simplifies the control of memory read operations.

The motion prediction processor 1 according to the above-described embodiment of the invention enables an expanded application of direct mode motion prediction, without increasing the processing loads. The present embodiment performs direct mode prediction with reasonable amounts of computation, particularly in the case where the reference picture 20 and current picture are of different frame/field coding types, or in the case where the block adaptive prediction mode is specified to at least one of the two pictures.

Video Coding Device

This and subsequent sections will discuss H.264 video coding and decoding devices as a more specific embodiment of the present invention. The H.264 standard offers the following options for macroblock size: 16×16, 16×8, 8×16, and 8×8. If the 8×8 mode is chosen, each of the four 8×8 macroblock partitions may be split into smaller blocks with the following sizes: 8×8, 8×4, 4×8, and 4×4 (known as macroblock sub-partitions). The baseline coding algorithm encodes each given source frame on a macroblock basis, switching between intraframe coding utilizing spatial redundancy within a frame and interframe coding utilizing temporal redundancy between successive frames. A video decoding process reverses the above steps to reconstruct original video from compressed video.

Figure 2:
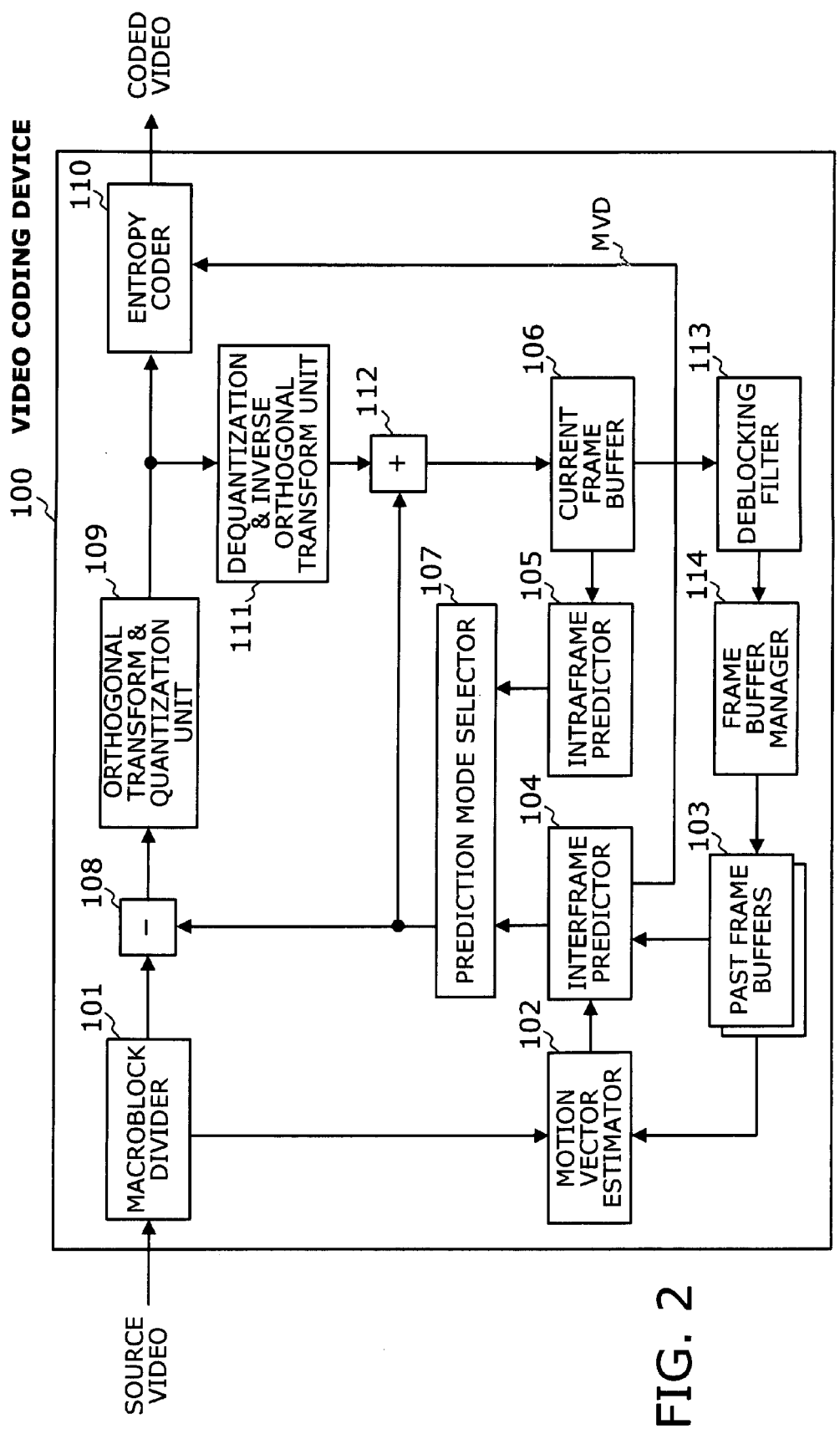
FIG. 2 is a block diagram of a video coding device according to an embodiment of the present invention.

FIG. 2 is a block diagram of a video coding device according to an embodiment of the present invention. The illustrated video coding device 100 includes the following elements: a macroblock divider 101, a motion vector estimator 102, past frame buffers 103, an interframe predictor 104, an intraframe predictor 105, a current frame buffer 106, a prediction mode selector 107, a subtractor 108, an orthogonal transform & quantization unit 109, an entropy coder 110, a dequantization & inverse orthogonal transform unit 111, an adder 112, a deblocking filter 113, and a frame buffer manager 114.

The macroblock divider 101 divides a given source picture into macroblocks of a predetermined size. The motion vector estimator 102 compares video signal components of a source macroblock with those of reference macroblocks stored in the past frame buffers 103, thereby calculating a motion vector for that source macroblock. Since motion vectors for neighboring blocks are often highly correlated with each other, the motion vector of a specific block can be predicted from vectors of its surrounding blocks. The interframe predictor 104 thus calculates a motion vector predictor (MVP) from such surrounding motion vectors and then calculates a motion vector difference (MVD) by subtracting MVP from the true motion vector calculated by the motion vector estimator 102. The intraframe predictor 105, on the other hand, performs intraframe coding of a frame stored in the current frame buffer 106.

The prediction mode selector 107 selects a coding mode that maximizes the efficiency of coding of the current macroblock by, for example, comparing prediction error of the interframe predictor 104 with that of the intraframe predictor 105. The prediction mode selector 107 creates coding mode parameters to indicate the selection result. The coding mode parameters are passed to the entropy coder 110 as part of data to be entropy-coded. The coding mode parameters include the size of macroblock partitions and the size of sub-macroblock partitions.

When the intraframe mode is selected, the divided source macroblocks are supplied as is from the macroblock divider 101 to the orthogonal transform & quantization unit 109. Those macroblocks are orthogonal-transformed and quantized, and the resulting transform coefficients are passed to the entropy coder 110 for entropy-coding and transmission. The transform coefficients are also decoded by the dequantization & inverse orthogonal transform unit 111 and sent into the current frame buffer 106.

When the interframe mode is selected, the interframe predictor 104 supplies the entropy coder 110 with MVD for entropy coding. In addition, the interframe predictor 104 produces a picture predicted with MVP and picture data in the past frame buffers 103 and sends it to the subtractor 108 through the prediction mode selector 107. The subtractor 108 subtracts the predicted picture from the source picture on a macroblock basis and sends the result to the orthogonal transform & quantization unit 109. The quantized output data is decoded locally by the dequantization & inverse orthogonal transform unit 111 and directed to the adder 112, where the prediction picture supplied through the prediction mode selector 107 is added. The resulting picture is written into the current frame buffer 106.

The entropy coder 110 encodes given data using the entropy coding algorithm, thus outputting a coded video signal carrying video data in compressed form. The reference picture stored in the current frame buffer 106 is subjected to the deblocking filter 113 to smooth out the boundary region between macroblocks. The resulting picture is entered to a past frame buffer 103 through the frame buffer manager 114.

Video Decoding Device

Figure 3:
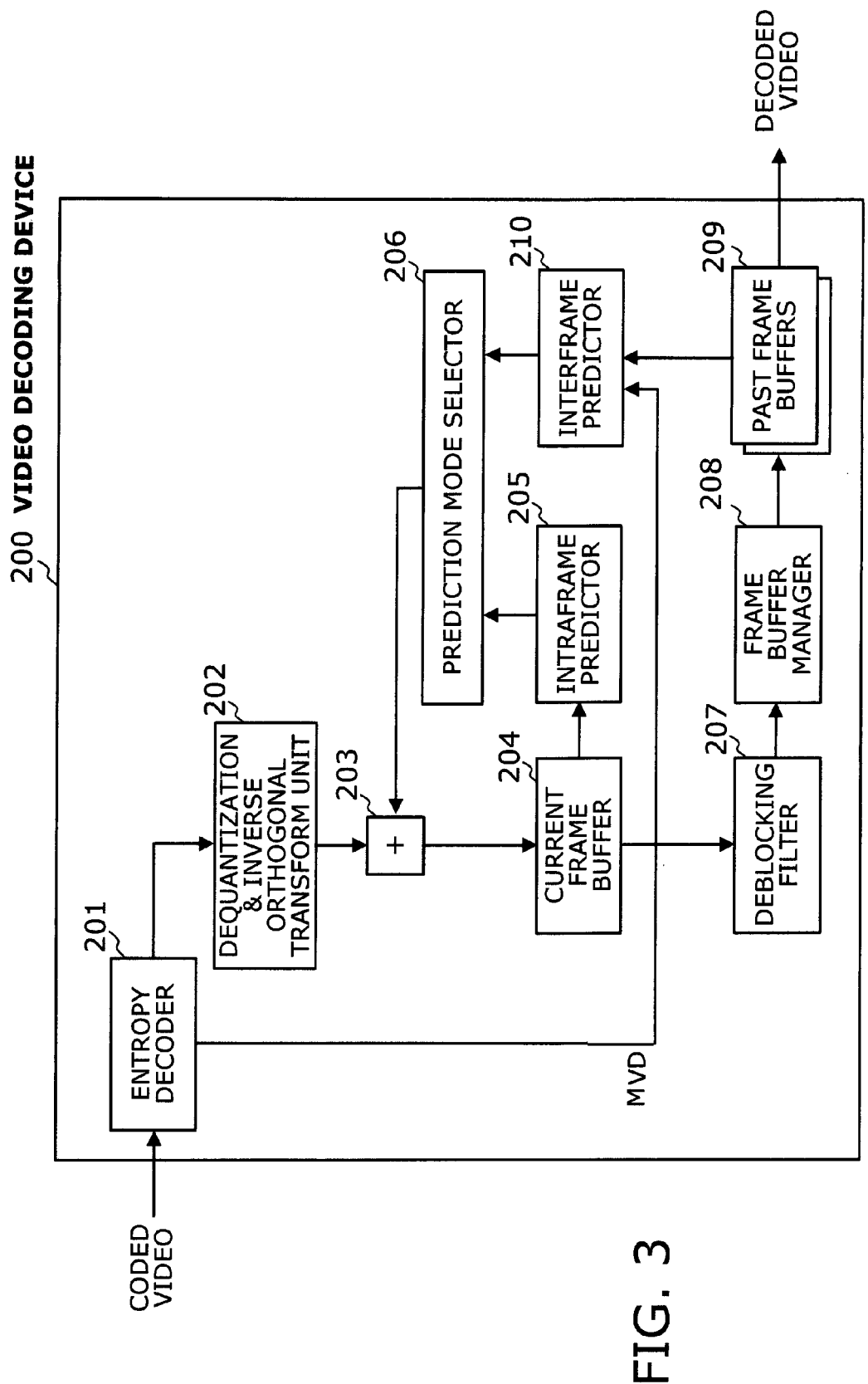
FIG. 3 is a block diagram of a video decoding device according to an embodiment of the present invention.

FIG. 3 is a block diagram of a video decoding device according to an embodiment of the present invention. The illustrated video decoding device 200 is formed from the following elements: an entropy decoder 201, a dequantization & inverse orthogonal transform unit 202, an adder 203, a current frame buffer 204, an intraframe predictor 205, a prediction mode selector 206, a deblocking filter 207, a frame buffer manager 208, past frame buffers 209, and an interframe predictor 210. With those elements, the video decoding device 200 decodes a coded video signal produced by the video coding device 100 of FIG. 2.

A given coded video signal is entropy-decoded by the entropy decoder 201 and then dequantized and back-transformed by the dequantization & inverse orthogonal transform unit 202. The outcomes of this decoding process include, among others, coding mode parameters and, in the case of interframe coding, motion vector data in the form of MVD. Based on the decoded coding mode parameters, the prediction mode selector 206 selects either the intraframe predictor 205 or the interframe predictor 210.

When the intraframe predictor 205 is selected, the picture frame reconstructed by the dequantization & inverse orthogonal transform unit 202 is routed to the current frame buffer 204. When the interframe predictor 210 is selected, the interframe predictor 210 reproduces the original motion vectors by adding MVDs to MVPs. With the resulting motion vectors, the interframe predictor 210 reproduces and supplies a prediction picture to the adder 203 through the prediction mode selector 206. The prediction error decoded at the dequantization & inverse orthogonal transform unit 202 is then added to this prediction picture. The resulting decoded picture is entered to the current frame buffer 204. Besides being output as a decoded video signal, this picture data in the current frame buffer 204 is transferred to one of the past frame buffers 209 through a deblocking filter 207 and frame buffer manager 208, where the deblocking filter 207 smoothes out macroblock boundaries.

The present invention is directed particularly to coding and decoding of B pictures in direct mode, in which the motion vector for a current block is calculated directly from a motion vector of its co-located block in a reference picture. Specifically, when the video coding device 100 operates in direct mode, the interframe predictor 104 calculates motion vectors for a currently selected block by referring to the same block of a reference picture that is immediately subsequent in display order. The interframe predictor 104 interpolates the motion vector of that block in proportion to the temporal distance between the pictures, thereby producing predicted motion vectors for the current block in two directions. If those predicted vectors have sufficient accuracy, relative to the ones calculated by the motion vector estimator 102, the video coding device 100 produces a code indicating that the direct mode is used for that picture, instead of encoding motion vector differences, thereby reducing the amount of coded data. When the video decoding device 200 decodes a B picture in direct mode, the interframe predictor 210 reproduces motion vectors for a current block from the motion vector of its co-located block in a reference picture, based on the same algorithm.

Memory Control for Direct Mode Coding

The direct-mode vector calculation requires calculated motion vectors to be stored in memory and read out later as reference vectors of co-located blocks. This means that the interframe predictor 104 in the video coding device 100, as well as the interframe predictor 210 in the video decoding device 200, has to have a motion vector memory and a read/write controller for that memory.

This section will explain memory control functions for direct mode coding. The present embodiment allows each picture to be coded in FRM, FLD, or MBAFF mode. Since a variety of combinations of coding modes and block partitions are possible for current and reference pictures, it is a complicated process for conventional encoders and decoders to control the frequent memory access operations for reading out motion vectors in direct mode. In contrast, the present embodiment stores only a minimum required number of motion vectors in memory, thus avoiding frequent memory access. The present embodiment also simplifies the memory access control by using two internal buffers, together with a table for looking up memory address from combinations of coding modes and block partitions.

Figure 4:
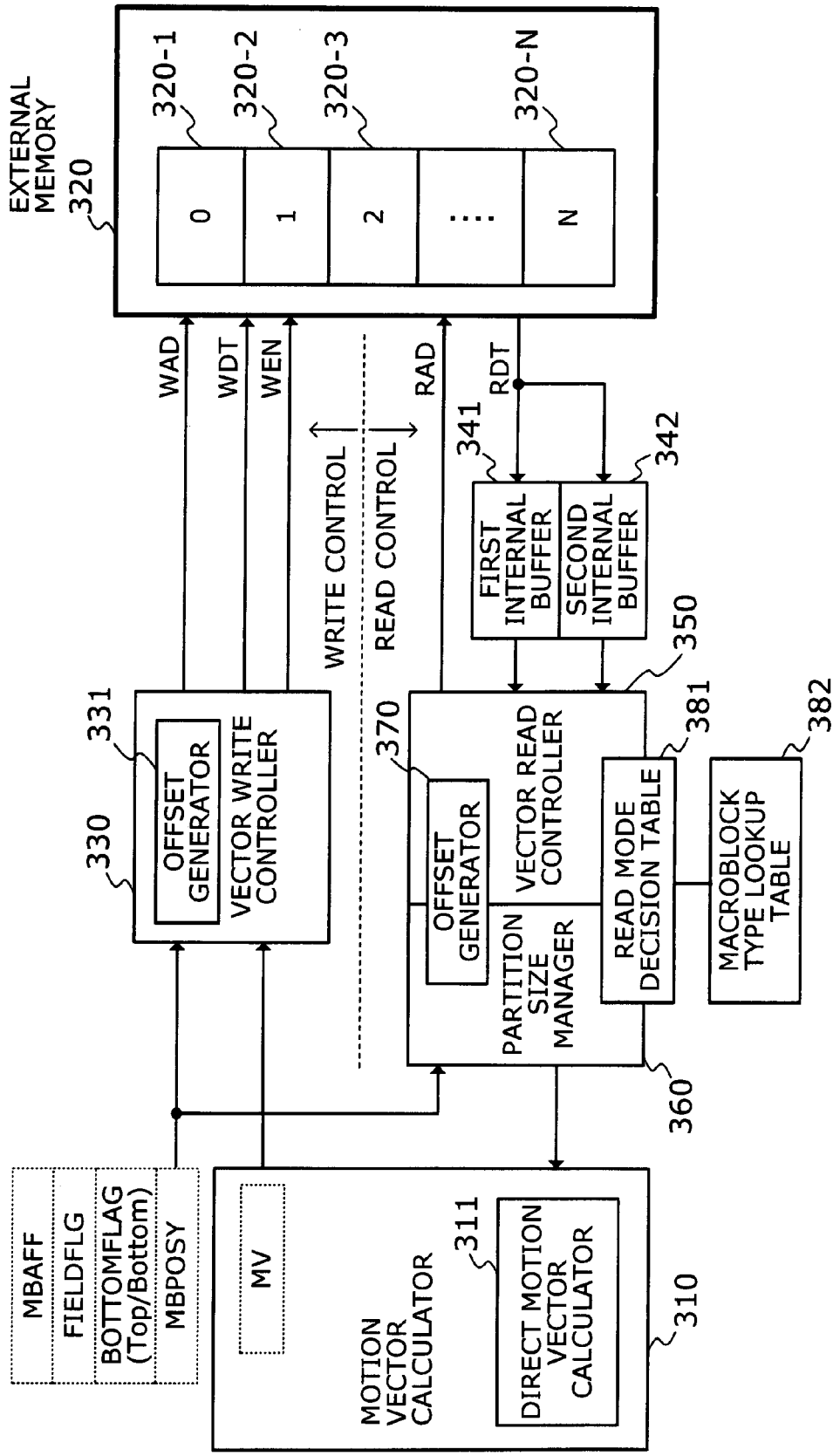
FIG. 4 is a block diagram illustrating memory control functions for direct mode.

FIG. 4 is a block diagram illustrating memory control functions for direct mode. While the following description assumes that those functions are implemented as part of the interframe predictor 210 in the above-described video decoding device 200 (FIG. 3), they can also be applied to the interframe predictor 104 of the video coding device 100 (FIG. 2).

As FIG. 4 shows, the interframe predictor 210 has a motion vector calculator 310 for motion vector calculation and an external memory 320 as temporary storage for motion vectors in direct mode. To implement the aforementioned memory control function, the interframe predictor 210 includes a vector write controller 330, first and second internal buffers 341 and 342, a vector read controller 350, and a partition size manager 360. It is assumed here that the external memory 320 is implemented as a separate circuit from the interframe predictor 210 (or video decoding device 200). This external memory 320 may also be shared with some other function blocks.

The motion vector calculator 310 calculates motion vectors for the motion compensated coding, whose primary function is to reproduce original motion vectors from motion vector differences decoded from a given compressed video stream. This motion vector calculator 310 includes a direct motion vector calculator 311 to calculate motion vectors for a current picture on the basis of co-located motion vectors of a reference picture read out of the external memory 320. When decoding a non-direct mode block, the interframe predictor 210 uses motion vector differences to reproduce vectors for motion compensation. When decoding a direct-mode block, the interframe predictor 210 uses the output of the direct motion vector calculator 311 to perform motion compensation. For later reference, the motion vectors used in this compensation are saved in the external memory 320 under the control of the vector write controller 330.

The configuration of FIG. 4 may also be applied to the video coding device 100, as mentioned above. In that case, the motion vector calculator 310 provides the vector write controller 330 with motion vectors calculated at the motion vector estimator 102 for non-direct mode blocks. For direct mode blocks, motion vectors calculated at the direct motion vector calculator 311 are provided to the vector write controller 330.

The external memory 320 is a first-in first-out (FIFO) memory with a sufficient capacity for storing reference motion vectors of at least one frame. The external memory 320 may be implemented with, for example, synchronous dynamic random access memory (SDRAM) devices. As will be described in detail later, its storage space is divided into a plurality (N) of memory areas 320-1 to 320-N (N≧2), where N represents the number of macroblock lines (i.e., horizontally aligned basic macroblocks with a size of 16×16 pixels). Those memory areas 320-1 to 320-N have equal capacity.

The vector write controller 330 controls write operations to the external memory 320 for storing motion vectors supplied as reference vectors from the motion vector calculator 310. As will be described later, the vector write controller 330 is designed to select an appropriate memory space of the external memory 320 such that the stored vectors can be retrieved easily as reference vectors, adaptive to various coding type combinations of current and reference pictures.

The vector write controller 330 includes an offset generator 331 to provide a write address offset for the external memory 320. This offset generator 331 identifies the coding type of a given current picture by examining its MBAFF and FIELDFLG flags. MBAFF flag indicates whether the current picture is coded in MBAFF mode, while FIELDFLG indicates whether the current picture is coded in field mode. Also, when the field mode is chosen for the current macroblock, the offset generator 331 tests a given BOTTOMFLG flag to determine its field type (i.e., whether it is a top field or a bottom field). The offset generator 331 further tests a given parameter MBPOSY to determine the vertical position of the current macroblock (which is assumed here to be a 16×16 basic macroblock). Based on the results of those tests, the offset generator 331 produces an offset for use by the vector write controller 330 to determine the top address of a memory area when it writes motion vectors. In such a vector write process, the vector write controller 330 outputs motion vectors to the external memory 320 as write data (WDT), generating write address (WAD) and asserting a write enable (WEN) signal.

The first and second internal buffers 341 and 342 are FIFO memories that serve as temporary storage of motion vectors read out of the external memory 320, under the control of the vector read controller 350, before they are transferred to the vector read controller 350.

The vector read controller 350 and partition size manager 360 share an offset generator 370 that produces a new offset of read address each time the MBPOSY parameter for the current picture is changed, so that an appropriate memory area 320-1 to 320-N of the external memory 320 will be selected. Also coupled to the vector read controller 350 and partition size manager 360 are a read mode decision table 381 and a macroblock type lookup table 382. They use the read mode decision table 381 to determine an appropriate read mode according to the combination of coding types of the current picture and reference picture, when reading motion vectors out of the external memory 320. The macroblock type lookup table 382 is used to choose an appropriate macroblock type for the current macroblock according to the read mode determined above, as well as to macroblock type of the co-located macroblock. The term "macroblock type" refers to the way of how the basic macroblock in question is partitioned or to be partitioned.

The vector read controller 350 reads motion vectors out of the external memory 320, consulting the read mode decision table 381 with the coding type (specified by MBAFF, FIELDFLG, and BOTTOMFLG) and frame/field type of the current picture, as well as with those of the reference picture. The vector read controller 350 transfers those motion vectors to the partition size manager 360 through first and second internal buffers 341 and 342. The read mode decision table 381 specifies how to direct the motion vectors read out of the external memory 320 to the first and second internal buffers 341 and 342, thereby ensuring the motion vector calculator 310 to receive necessary reference motion vectors in an appropriate order for calculation of a motion vector at each block within the current macroblock.

The role of the partition size manager 360 is to choose an appropriate macroblock type for the current macroblock, to which the motion vectors supplied from the vector read controller 350 should be applied. The partition size manager 360 serves this role by consulting the macroblock type lookup table 382 with the macroblock type of a co-located macroblock in a reference picture. By doing the above, the partition size manager 360 consolidates some partitions of the current macroblock, thus reducing the number of blocks, as well as their corresponding motion vectors, to be subjected to the direct motion vector calculator 311. In the context of video coding, this also means reduction in the number of motion vectors to be coded.

External Memory Write Operation

Figure 5:
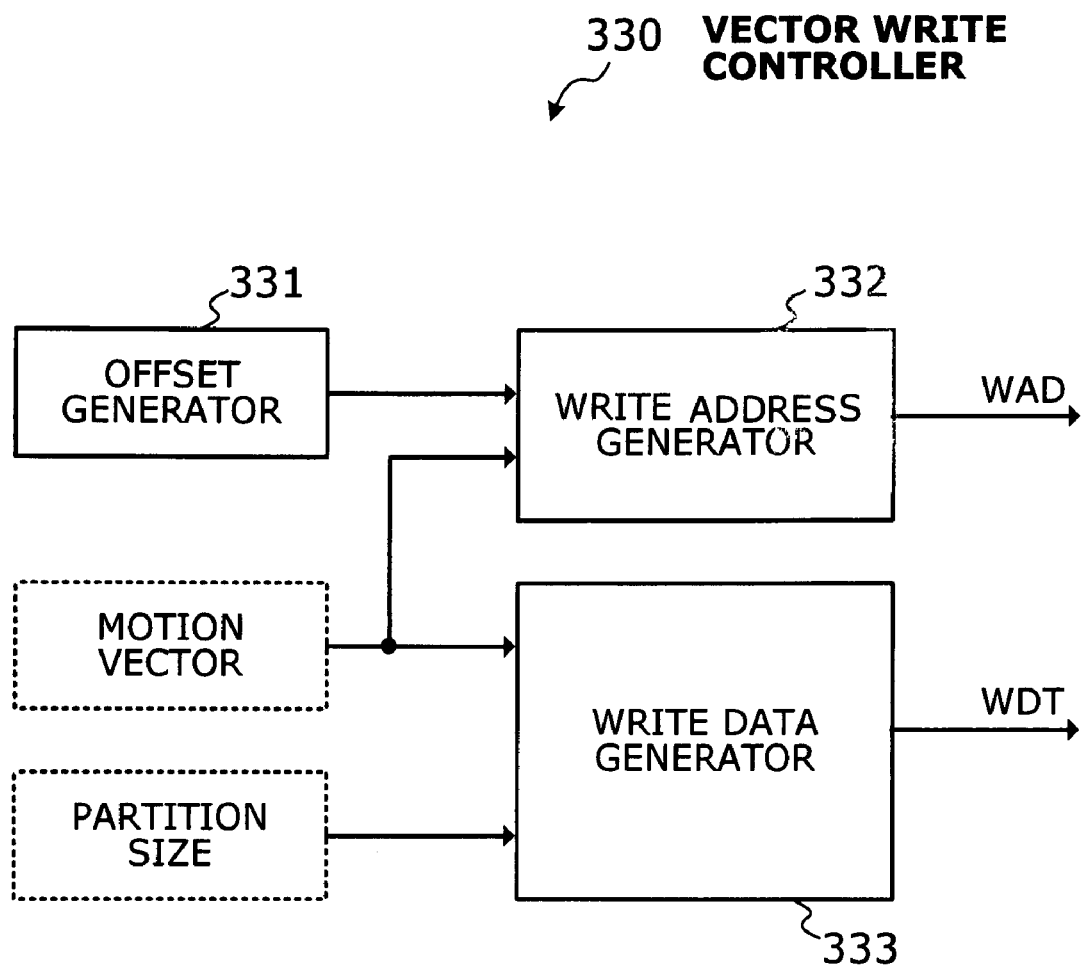
FIG. 5 is a block diagram showing an example internal structure of a vector write controller.

The above memory control functions will now be described in greater detail below. The explanation begins with how motion vectors are written in the external memory 320. FIG. 5 is a block diagram showing an example internal structure of the vector write controller 330. As can be seen, the vector write controller 330 includes an offset generator 331, a write address generator 332, and a write data generator 333.

The write address generator 332 produces write address WAD for writing motion vectors MV supplied from the motion vector calculator 310, along with header information of each macroblock, into the external memory 320. Such a write operation takes place for each macroblock line, the top address of which is determined by an offset value that the offset generator 331 provides. The write data generator 333 compiles header information from partition size information about macroblocks which has been identified when the motion vector calculator 310 produces motion vectors MV. The write data generator 333 supplies the external memory 320 with write data WDT including those motion vectors and their corresponding header information.

With the above-described elements, the vector write controller 330 writes motion vectors MV of a reference picture in the external memory 320. FIGS. 6A to 6B show how reference picture data is stored in the external memory 320, where "MB_POS" represents horizontal and vertical positions of a 16×16 basic macroblock within a picture. "LINE_SIZE" represents the capacity of a single memory area 320-1 to 320-N corresponding to each macroblock line allocated in the external memory 320.

When FRM is specified as the current coding type, motion vectors of each macroblock line are supposed to be entered sequentially to its corresponding memory area 320-1 to 320-N. In the case of FLD type, motion vectors of a top-field macroblock line are first entered to an odd-numbered memory area 320-1 to 320-N, and then those of a bottom-field macroblock line are directed to an even-numbered memory area. This process is repeated for every macroblock line. As a result, the memory areas 320-1 to 320-N in the external memory 320 are filled alternately with motion vectors of top-field macroblock lines and those of bottom-field macroblock lines. This means that the data structure of a picture is eventually converted from field mode to frame mode.

In the case of MBAFF type, the given picture is processed on a macroblock pair basis; i.e., the coder handles each pair of vertically adjacent basic macroblocks as a single unit. For this reason, the external memory 320 should be divided into larger partitions with a size of (LINE_SIZE×2). Specifically, every two successive memory areas 320-1 to 320-N are assigned to a horizontal line of macroblock pairs (called "macroblock pair line"). The external memory 320 stores motion vectors of such macroblock pair lines in the processing order.

Independently of the above picture coding types, each macroblock may be partitioned into a plurality of blocks in an individual way. Each memory area 320-1 to 320-N (or each two memory areas in the case of MBAFF mode) may therefore contain a different amount of data. The memory areas 320-1 to 320-N may actually store a fewer amount of motion vectors than they can accommodate. In FRAME or FIELD coding mode, the vector write controller 330 fills each memory area from its top address with motion vectors of a different macroblock line, leaving the remaining space vacant. Likewise, in MBAFF coding mode, the vector write controller 330 fills each memory area from its top address with motion vectors of a different macroblock pair line, leaving the remaining space vacant.

By storing reference motion vectors in the above-described way, the present embodiment eliminates the need for converting every basic macroblock in a reference picture into 4×4 sub-macroblocks and writing as many motion vectors as the number of sub-macroblocks. Since the memory has only to accommodate a fewer vectors in most cases, the present embodiment reduces both the memory write access and subsequent memory read access (by the vector read controller 350) for storage and retrieval of motion vectors, thus increasing the processing speed.

External Memory Read Operation

FIG. 7 shows a read mode decision table 381. The illustrated read mode decision table 381 is formed from the following data fields for its primary purpose: "Current Picture Type," "Reference Picture Type," and "Read Mode." The read mode decision table 381 of FIG. 7 also provides "Internal Buffer" and "MBColMODE" fields for explanatory purposes (described later).

Specifically, the current picture type field contains coding type and frame/field type of current picture. The reference picture type field contains the same for reference picture. A read mode value, ranging from 0 to 6, is defined for each particular combination of coding types and frame/field types of the current and reference pictures. To avoid potential confusion, FIG. 7 and subsequent figures use the lowercase "form" and "fld" to represent frame macroblocks and field macroblocks, respectively, in contrast to the uppercase "FRM" and "FLD" representing picture coding types.

The vector read controller 350 consults the read mode decision table 381 with a specified coding type and frame/field type of the current and reference pictures, thereby obtaining a corresponding read mode. This read mode tells the vector read controller 350 how to read motion vectors out of the external memory 320 and how to send them to the first and second internal buffers 341 and 342.

For addition information, the read mode decision table 381 of FIG. 7 gives an "Internal Buffer" field to indicates the number of internal buffers to be used in each read mode. The field value "1" means that only the first internal buffer 341 will be used, whereas the value "2" denotes that both the first and second internal buffers 341 and 342 will be used. Further included in the read mode decision table 381 of FIG. 7 is a "MBColMode" field, which shows a mode determined from the combination of coding types and frame/field types of the current and co-located macroblocks.

Note that H.264 does not include the combination of an MBAFF current picture and an FRM reference picture. For this reason, the read mode decision table 381 has no entries for that particular combination.

Referring now to FIGS. 8A-8B and 9A-9C, the relationships between current and co-located macroblocks classified by MBColMode values 0 to 4 will be described. Then presented are more specific examples for the read sequence in each mode.

FIGS. 8A, 8B, and 9A to 9C show the relationships between blocks of current and reference macroblocks in various combinations of their frame/field types.

In MBColMode=0 (FIG. 8A), both the current macroblock (CurrMB) and co-located macroblock (MBCol) are frame macroblocks in frame-coded pictures. The minimum block size in this case is 4×4 pixels for both the current and co-located macroblocks. The motion vector of each such block in the current macroblock can be directly derived from a co-located motion vector within the co-located macroblock. This direct calculation process simply requires reference motion vectors of those blocks to be retrieved in the order that they are processed. Note that a block number is given to each block of the current and co-located macroblocks in FIGS. 8A-8B and 9A-9C. This indicates that the motion vectors for those current blocks are calculated from co-located blocks with corresponding numbers.

In the case of MBColMode=1 (FIG. 8B), both the current and co-located macroblocks are frame macroblocks in MBAFF pictures or field macroblocks in FRM or MBAFF pictures. FIG. 8B shows that the minimum block size in this case is 4×4 for the co-located macroblock and 8×8 for the current macroblock. For this reason, only four sub-macroblocks 505 to 508 of the co-located macroblock are referenced when calculating direct-mode motion vectors for the current blocks 501 to 504.

In the case of MBColMode=2 (FIG. 9A) or MBColMode=3 (FIG. 9B), the current macroblock is a frame macroblock in an FRM or MBAFF picture, whereas the co-located macroblock is a field macroblock in an FLD picture. Note that MBColMode=2 is applied when processing odd-numbered lines of the current macroblock, while MBColMode=3 is applied when processing even-numbered lines of the same. In those conditions, the minimum block size is 4×4 for the co-located macroblock and 8×8 for the current macroblock.

More specifically, in the case of MBColMode=2 (FIG. 9A), four sub-macroblocks 515 to 518 in the co-located macroblock are referenced when calculating direct-mode motion vectors for the current blocks 511 to 514. In the case of MBColMode=3 (FIG. 9B), on the other hand, four sub-macroblocks 525 to 528 in the co-located macroblock are referenced when calculating direct-mode motion vectors for the current 8×8 blocks 521 to 524. Thus the above combination of coding types requires the same co-located macroblock data to be read out for the individual vector calculation of odd-numbered lines and even-numbered lines of the current macroblock.

Figure 9A:
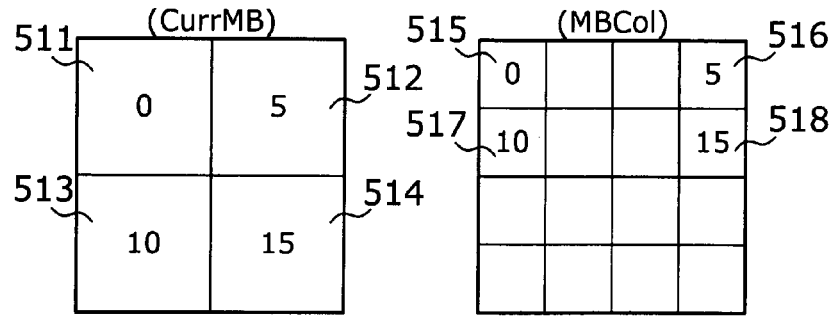
Figure 9B:
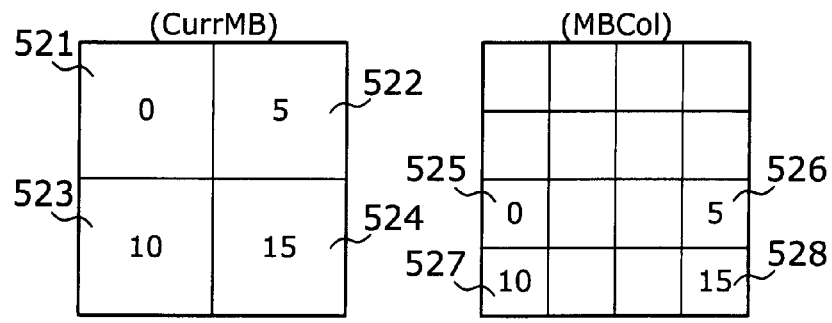
Figure 9C:
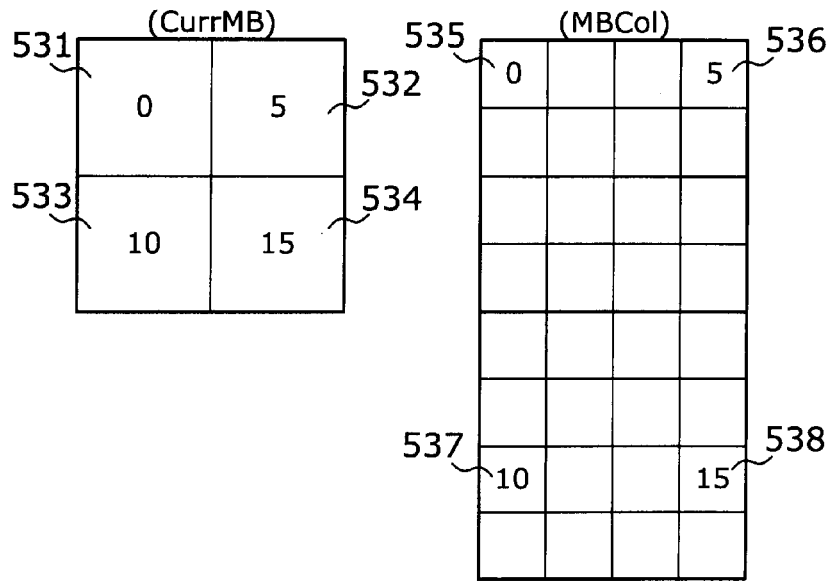

MBColMode=4 is applied to every other case. FIG. 9C, however, only shows the case where the current macroblock is a field macroblock whereas the co-located macroblock is a frame macroblock. Motion estimation of the current macroblock in this case has to make reference to two vertically aligned co-located macroblocks for top-field prediction and bottom-field prediction. The current macroblock is partitioned into four macroblocks 531 to 534. As can be seen from FIG. 9C, the motion vectors for macroblocks 531 and 532 are directly derived from sub-macroblocks 535 and 536 of the upper co-located macroblock, respectively. Likewise, the motion vectors of macroblocks 533 and 534 are derived respectively from sub-macroblocks 537 and 538 of the lower co-located macroblock.

FIGS. 10A, 10B, 11A, 11B, and 12A to 12C show how data is read out in each different read mode, where the numerals in circles indicate the order of reading data. Further, FIGS. 13 to 19 show the order of macroblocks in each different read mode. FIGS. 13 to 19 are each formed from three parts. The topmost part shows the order of writing co-located macroblocks in the external memory 320. The middle part shows the order of reading co-located macroblocks from the external memory 320, assuming a particular read mode. The bottommost part shows the order of direct-mode processing in the current macroblock. The orders are indicated by dotted lines. Note that the illustrated partitioning of basic macroblocks is only an example. The symbols MV0, MV1, and so on represent motion vectors contained in each basic macroblock according to the processing order in that basic macroblock.

Figure 10A:
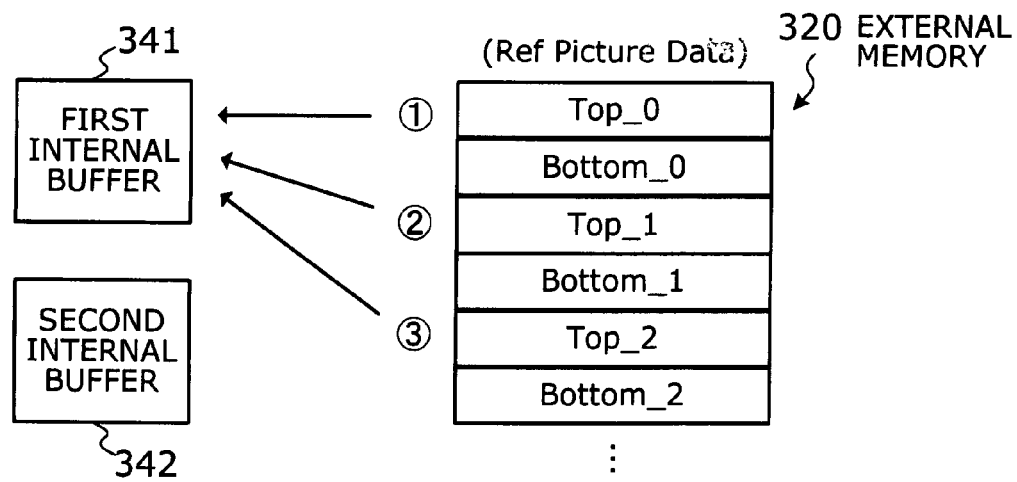
FIGS. 10A, 10B, 11A, 11B, and 12A to 12C show how data is read in different read modes.

Read mode 0 is selected when the current and reference pictures are both FLD pictures. In this coding type combination, the co-located macroblock is associated with the current macroblock in the way shown in FIG. 8B. Motion vectors for individual fields of the current macroblock can be predicted by reading the external memory 320 to obtain the data of each corresponding co-located macroblock. FIG. 10A depicts this process in read mode 0. Specifically, the top-field data is read out of the external memory 320, selectively from top-field macroblock lines Top_0, Top_1, and so on, and sent to the first internal buffer 341. This is accomplished by selecting odd-numbered memory areas from among the memory areas 320-1 to 320-N and transferring their data sequentially to the first internal buffer 341. Likewise (although not shown in FIG. 10A), the bottom-field data is read out of bottom-field macroblock lines Bottom_0, Bottom_1, and so on (i.e., even-numbered memory areas of the external memory 320) and transferred sequentially to the first internal buffer 341.

More specifically, FIG. 13 shows a top-field reference picture 601 and a top-field current picture 602 as an example of the above combination of coding types. The external memory 320 stores data of the reference picture 601 in the order shown in the uppermost part of FIG. 13. By simply following this storage order, the data of necessary co-located macroblocks comes out of the external memory 320 (see the middle part of FIG. 13) in complete accordance with the processing order of current macroblocks of each field (see the bottommost part of FIG. 13).

After all, a series of reference motion vectors of co-located macroblocks (e.g., macroblock 604) necessary for direct-mode motion estimation of the current macroblocks can be obtained by reading out the data of top-field (or bottom-field) co-located macroblocks in the order shown in FIG. 10A. The read data is once transferred to the first internal buffer 341 in that order and then subjected to a vector calculation process, maintaining the same order.

Figure 10B:
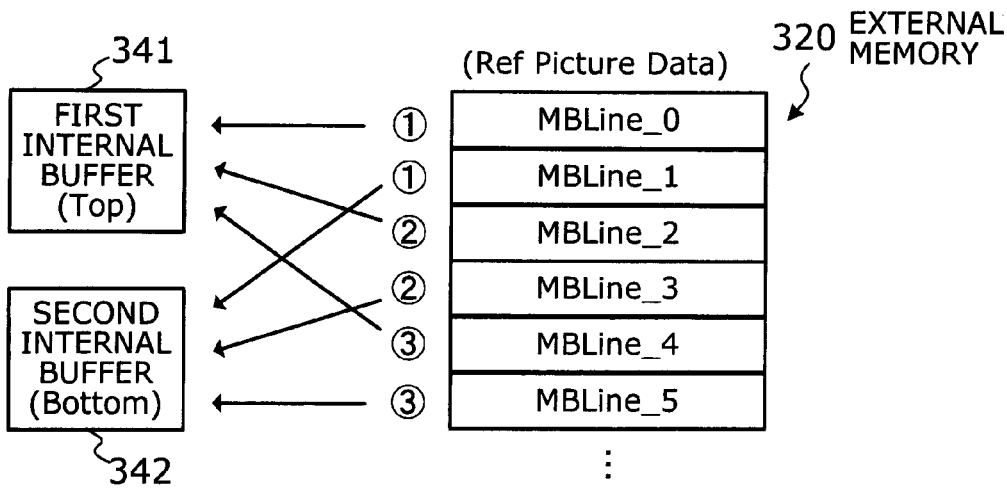

Read mode 1 is selected when the current picture is an FLD picture while the reference picture is an FRM picture. In this coding type combination, the current macroblock and co-located macroblock are associated in the way shown in FIG. 9C. To calculate motion vectors for top and bottom fields of the current macroblock, it is necessary to make reference to two vertically adjacent macroblocks in the reference picture as co-located macroblocks. FIG. 10B shows such a memory read process in read mode 1. Specifically, both the first and second internal buffers 341 and 342 are used to receive data of each adjacent pair of macroblock lines (e.g., MBLine_0 and MBLine_1) read out of the external memory 320.

More specifically, the topmost part of FIG. 14 shows how the data of a reference picture 611 is stored in the external memory 320. The current picture 612, on the other hand, is processed in the order shown in the bottommost part of FIG. 14. Suppose, for example, that a direct-mode macroblock 613 in the current picture 612 is selected. Since the current picture 612 is of FLD type, the direct vector calculation for the current macroblock 613 needs data of two macroblocks 614 and 615 in the reference picture 611. For this reason, a memory read sequence takes place in the way shown in the middle part of FIG. 14. That is, a macroblock line containing the upper macroblock 614 is supplied to the first internal buffer 341, and another macroblock line containing the lower macroblock 615 is supplied to the second internal buffer 342. The required vector data of co-located macroblocks (e.g., macroblocks 614 and 615 in this example) can be obtained simultaneously by reading data sequentially from the two internal buffers 341 and 342.

Read mode 2 is selected when the current picture is an FLD picture while the reference picture is an MBAFF picture. The topmost part of FIG. 15 shows such an MBAFF reference picture 621, each macroblock pair line of which is stored in a corresponding memory area 320-1 to 320-N of the external memory 320. The current picture 622, on the other hand, is processed in the order shown in the bottommost part of FIG. 15. The direct vector calculation for a current macroblock has to make reference to a corresponding pair of macroblocks in the reference picture 621. Suppose, for example, that a direct-mode macroblock 623 in the current picture 622 is selected for prediction. In this case, the data of two macroblocks 624 and 625 in the reference picture 621 is needed to calculate a motion vector for the current macroblock 623.

Figure 11A:
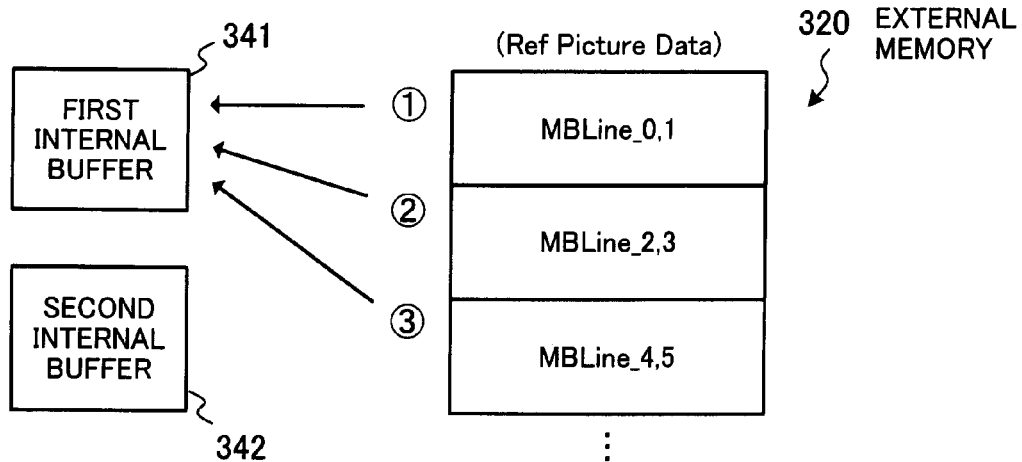

Accordingly, the memory read sequence in read mode 2 proceeds as shown in the middle part of FIG. 15 and FIG. 11A to transfer a series of macroblock pair lines (e.g., MBLine_0 and _1, MBLine_2 and _3, . . . in FIG. 11A) from the external memory 320 to the first internal buffer 341. This is achieved by a sequential data transfer from the memory areas 320-1, 320-2, . . . 320-N to the first internal buffer 341. The vector read controller 350 then reads out the stored data for each macroblock pair from the first internal buffer 341, thus supplying motion vectors of required co-located macroblocks to the motion vector calculator 310.

Figure 11B:
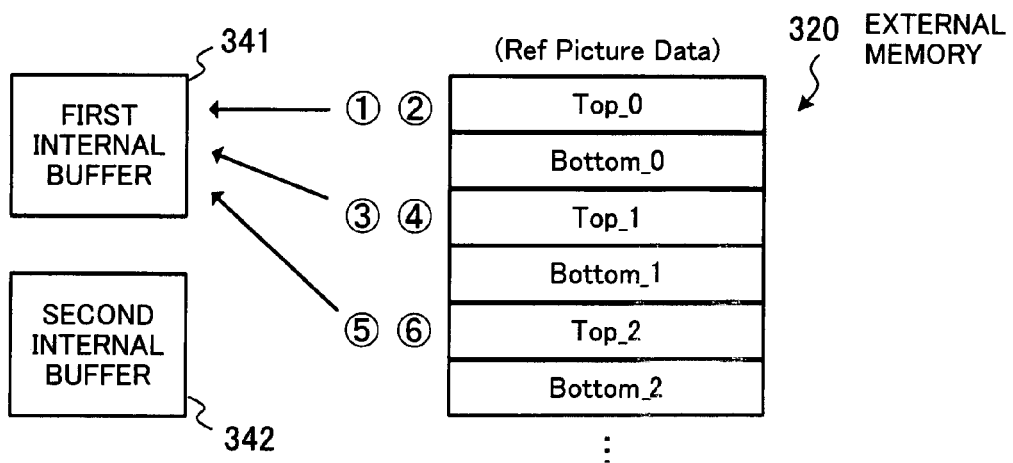

Read mode 3 is selected when the current picture is an FRM picture while the reference picture is an FLD picture. In this coding type combination, data of the same macroblock line of reference picture macroblock data is used first for odd-numbered lines of the current picture and then for even-numbered lines of the current picture. FIG. 11B depicts this memory read process in read mode 3. Specifically, the data of top-field macroblock lines (i.e., Top_0, Top_1, . . . ) is read out of odd-numbered memory areas, two times for each line, and sent to the first internal buffer 341.

More specifically, the topmost part of FIG. 16 shows how data of a reference picture 631 is stored in the external memory 320. That is, the data of top-field macroblock lines is written into odd-numbered memory areas of the external memory 320. Then the data of bottom-field macroblock lines is written into even-numbered memory areas. When reference vector data in the external memory 320 is needed, the vector read controller 350 reads them out in the way shown in the middle part of FIG. 16. That is, it reads an odd-numbered memory area twice and then the next odd-numbered memory area twice. All the read data is transferred to the first internal buffer 341, thus permitting the data of co-located macroblocks on the same macroblock line to be read out twice from the same first internal buffer 341 without a break. Suppose, for example, that a macroblock 633 in the current picture 632 is selected for direct-mode prediction as shown in the bottommost part of FIG. 16. The first internal buffer 341 outputs data of its corresponding macroblock 634 for calculation of odd-numbered lines and then again the same data for even-numbered lines.

Figure 12A:
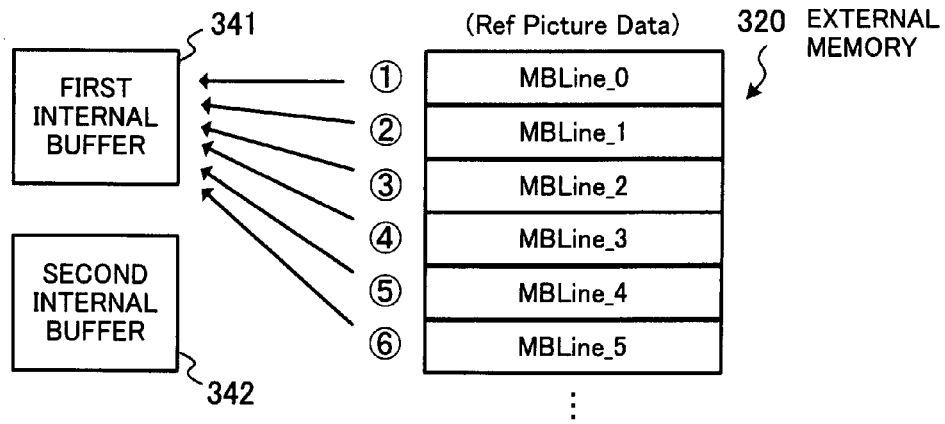

Read mode 4 is selected when the current picture and reference picture are both FRM pictures. FIG. 8A shows the block-to-block relationships between a current macroblock and co-located macroblock in this read mode. For direct mode calculation, the motion vector calculator 310 requires data of co-located macroblocks in the same order as it goes through the current picture. Accordingly the vector read controller 350 reads a series of macroblock lines (MBLine_0, MBLine_1, . . . ) from their corresponding memory areas 320-1 to 320-N of the external memory 320 and sends them all to the first internal buffer 341 as shown in FIG. 12A. Specifically, FIG. 17 shows that the vector read controller 350 reads the data of co-located macroblocks of a reference picture 641 out of the external memory 320 in the same order as the motion vector calculator 310 processes the current macroblock of the current picture 642.

Figure 12B:
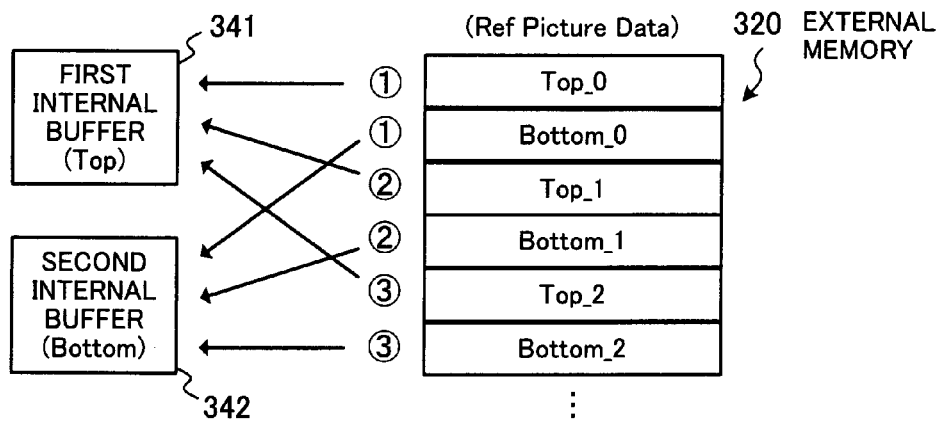

Read mode 5 is selected when the current picture is an MBAFF picture while the reference picture is an FLD picture. The block-to-block relationship in this combination of current and co-located macroblocks is equivalent to the case where FIGS. 9A and 9B are applied respectively to the upper and lower portions of a macroblock pair. Since the MBAFF current picture is processed on a macroblock pair basis, the motion vector calculator 310 has to be supplied with the data of each pair of upper and lower co-located macroblocks from the external memory 320. Accordingly, the vector read controller 350 transfers data of an upper macroblock line (e.g., Top_0) to the first internal buffer 341, as well as data of a lower macroblock line (e.g., Bottom_0) to the second internal buffer 342, in a parallel fashion as shown in FIG. 12B. In other words, it selects odd-numbered memory areas from among the memory areas 320-1 to 320-N for the first internal buffer 341 and even-numbered memory areas for the second internal buffer 342.

The topmost part of FIG. 18 shows how macroblock data of a reference picture 651 is written in the external memory 320. This FLD reference picture 651 consists of a top field 651a and a bottom field 651b. In the external memory 320, the top field data and bottom field data of a macroblock line are stored in consecutive memory areas according to the format shown in FIG. 6B. The motion vector calculator 310, on the other hand, performs direct-mode prediction for the MBAFF current picture 652 on a macroblock pair basis as shown in the bottommost part of FIG. 18. The vector read controller 350 therefore enables the motion vector calculator 310 to receive data of each macroblock pair from the first and second internal buffers 341 and 342 as shown in the middle part of FIG. 18. This is made possible by previously transferring data of upper macroblock lines and lower macroblock lines to the first and second internal buffers 341 and 342, respectively. Suppose, for example, that direct mode is specified on a macroblock pair 653 in the current picture 652. In this case, its corresponding macroblocks 654 and 655 are read out consecutively for use by the motion vector calculator 310.

Figure 12C:
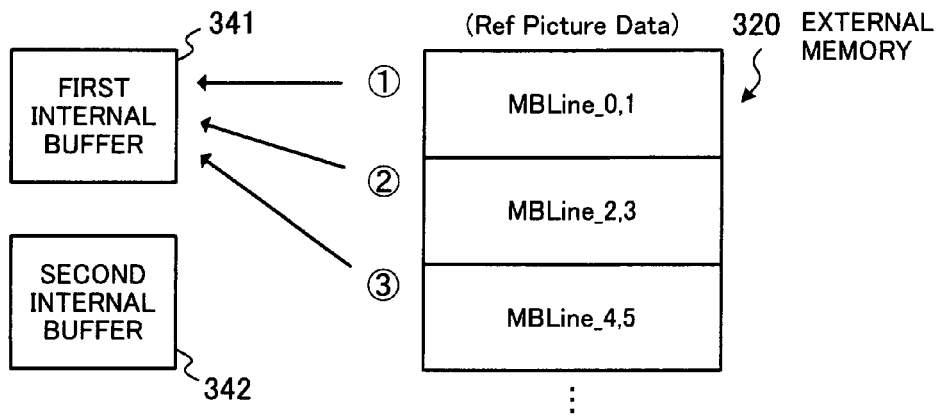

Read mode 6 is selected when both the current and reference pictures are MBAFF pictures. In this combination of coding types, the processing order of macroblock data in the current picture 662 coincides with the write order of macroblock data in the reference picture 661 as can be seen from the topmost part and bottommost part of FIG. 19. Accordingly, the vector read controller 350 reads out data of macroblock pair lines (e.g., MBLine_0 and _1, MBLine_2 and _3, . . . ) sequentially from the external memory 320 and transfers the data to the first internal buffer 341, as shown in FIG. 12C and the middle part of FIG. 19. That is, the data is transferred from the memory areas 320-1 to 320-N to the first internal buffer 341 in the illustrated order.

Internal Buffer Structure

Figure 20:
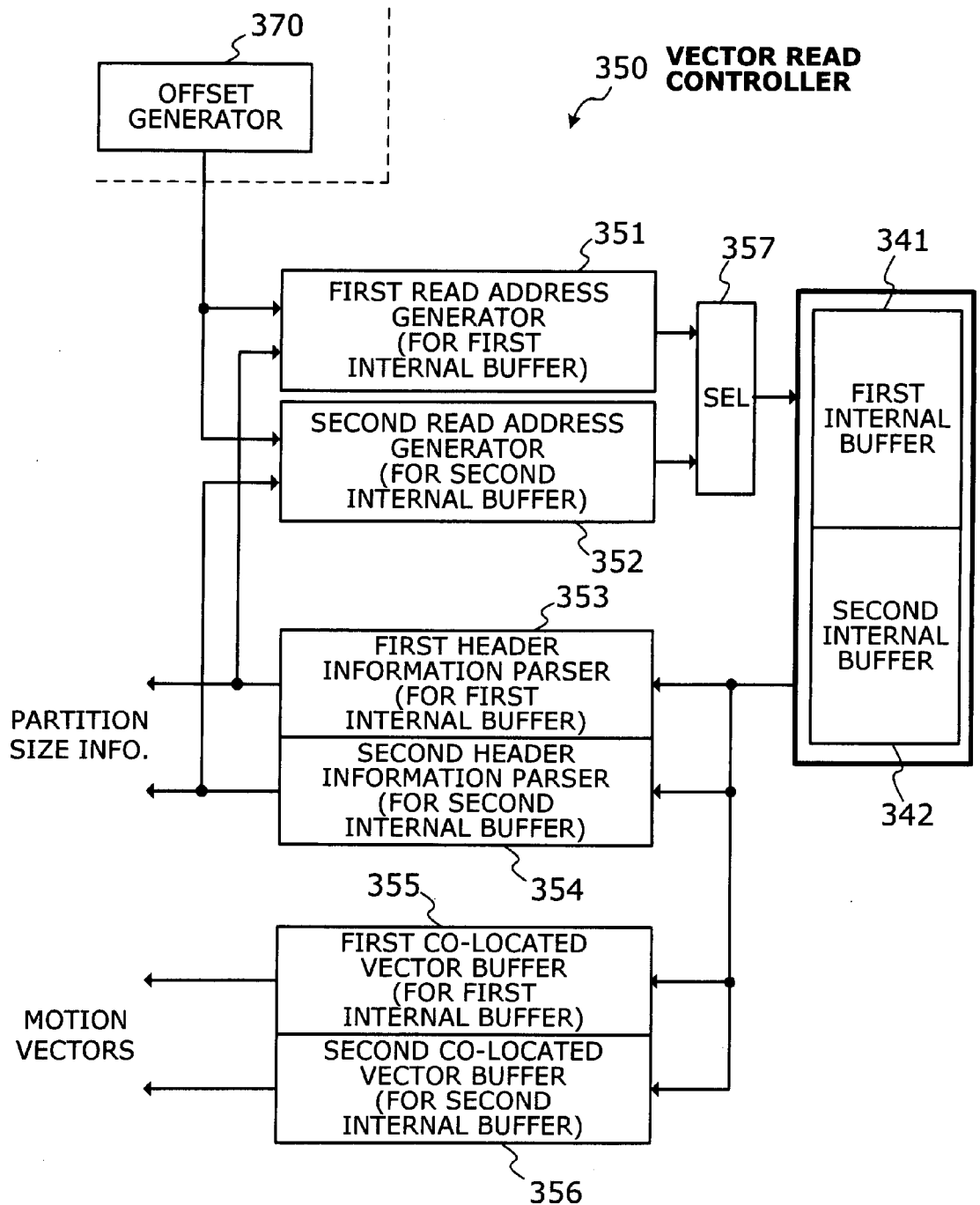
FIG. 20 is a block diagram of a vector read controller, with a focus on its read control functions for internal buffers.

FIG. 20 is a block diagram showing an example structure of the vector read controller 350, with a focus on the read control functions for internal buffers. To implement the intended functions, the vector read controller 350 employs first and second read address generators 351 and 352, and first and second header information parsers 353 and 354, and first and second co-located vector buffers 355 and 356, and a selector (SEL) 357.

The first and second read address generators 351 and 352 produce read address signals for the first and second internal buffers 341 and 342, respectively. Specifically, the first and second read address generators 351 and 352 synchronize themselves with the processing of macroblock lines of a given current picture, based on the timing at which the offset generator 370 outputs an offset value. The selector 357 provides the first and second internal buffers 341 and 342 with the produced read address signals.

The first and second header information parsers 353 and 354 are coupled to the first and second internal buffers 341 and 342, respectively, to receive header information that is added to each co-located macroblock of a reference picture stored therein. Header information describes, among others, the partition size of a co-located macroblock. The first and second header information parsers 353 and 354 parse the information to determine how many blocks the co-located macroblock is divided into. Their respective decisions are passed to the first and second read address generators 351 and 352. The partition size information extracted from header information is also sent to the partition size manager 360 (FIG. 4).

The first and second read address generators 351 and 352 produce as many addresses as the number of block partitions that is determined. This permits every motion vector contained in the co-located macroblock to be read out of the first and second internal buffers 341 and 342. Those motion vectors are temporarily held in the first and second co-located vector buffers 355 and 356 before they are sent out to the partition size manager 360.

Figure 21:
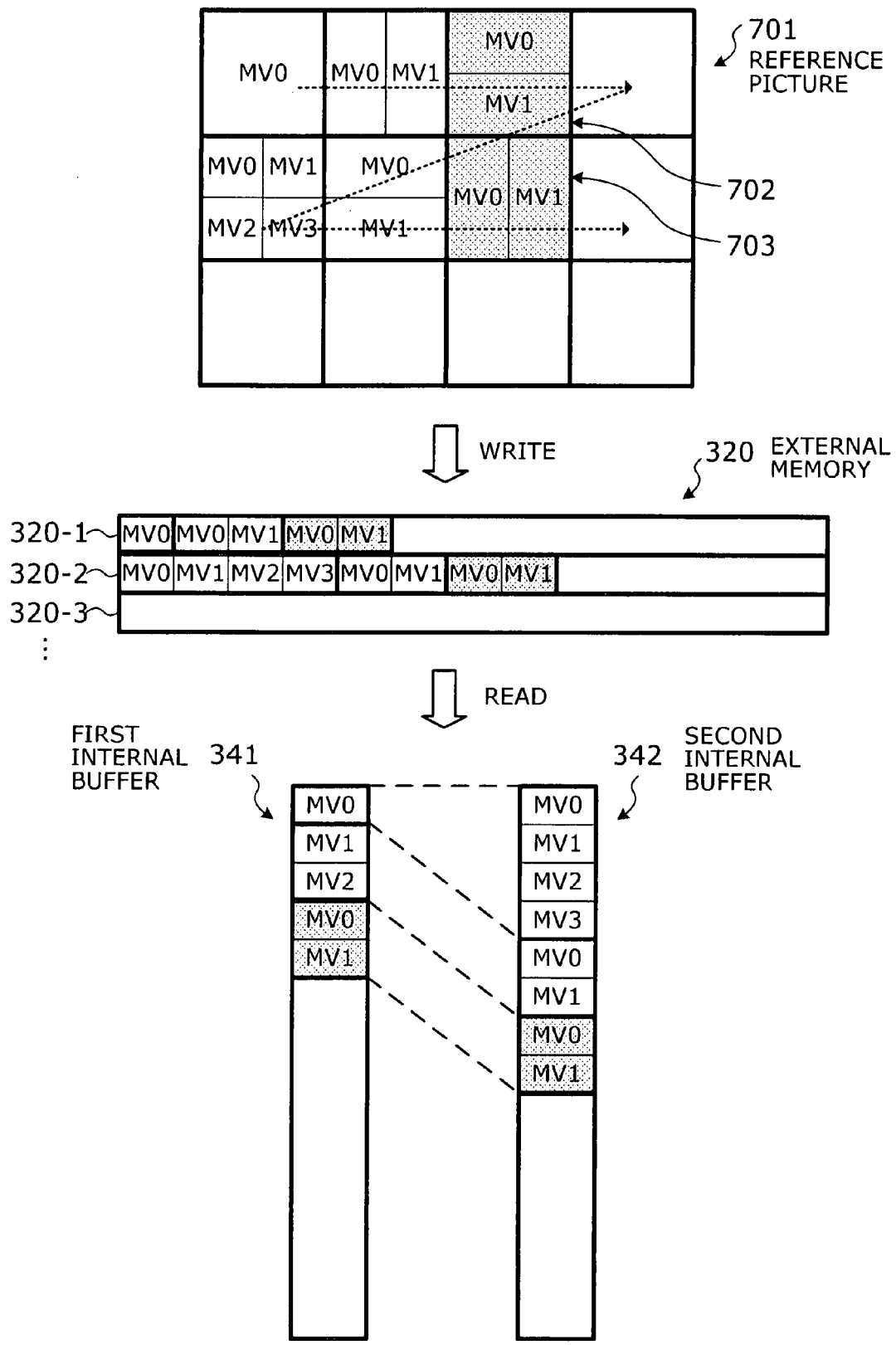
FIG. 21 schematically shows how data is transferred to two internal buffers.

FIG. 21 schematically shows how data is transferred to the two internal buffers 341 and 342. FIG. 21 (as well as FIG. 22 that follows) uses a series of symbols such as "MV0" and "MV1" to indicate motion vectors corresponding to individual blocks within a basic macroblock in the order they are used.

Specifically, FIG. 21 shows an example of read mode 1. Motion vectors calculated for a reference picture 701 are stored in a plurality of memory areas 320-1 to 320-N in the external memory 320 separately for each individual macroblock line. The reference picture 701 includes variously partitioned basic macroblocks to be referenced later as co-located macroblocks. For this reason, each memory area 320-1 to 320-3 may accommodate a different number of motion vectors. That is, each set of motion vectors calculated for a single macroblock line is stored as a variable-length data object in the external memory 320.

The data written in such a manner is read out of two successive memory areas (320-1 and 320-2 in the present example) in a parallel fashion, for entry to the first and second internal buffers 341 and 342, respectively. The vector read controller 350 makes sequential access to each memory area with a series of consecutive read addresses, thereby retrieving a set of motion vectors corresponding to a single macroblock line. The bottommost part of FIG. 21 shows the resulting state of the first and second internal buffers 341 and 342. The first and second header information parsers 353 and 354 reads out header information from the first and second internal buffers 341 and 342 in a parallel fashion and inform the first and second read address generators 351 and 352 of the number of block partitions. This enables the first and second internal buffers 341 and 342 to output as many motion vectors as the number of block partitions.

With the above-described control, the first and second internal buffers 341 and 342 output motion vectors of, for example, basic macroblocks 702 and 703 in the reference picture 701 concurrently or consecutively for use as reference vectors in the direct mode prediction.

Figure 22:
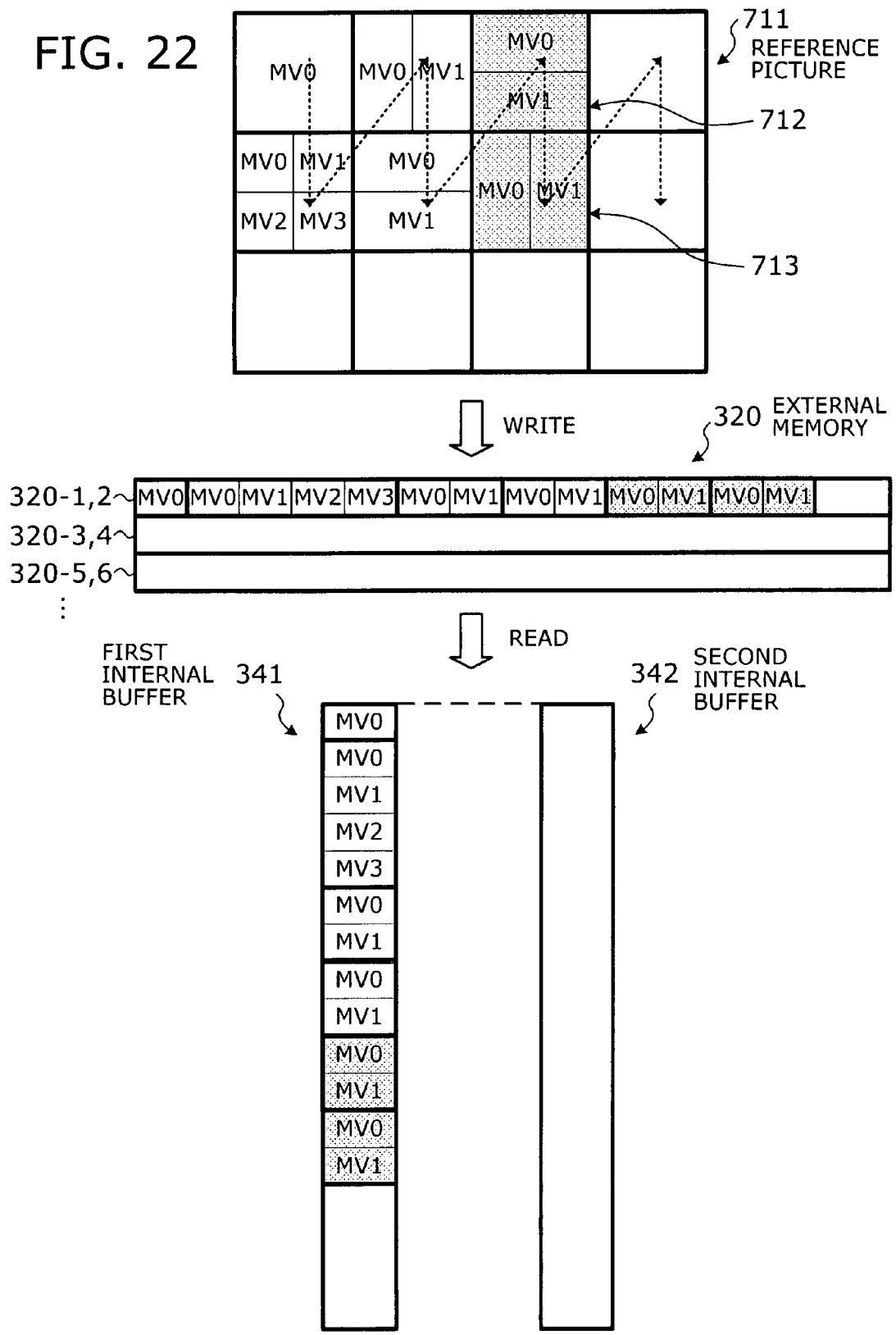
FIG. 22 schematically shows how data is transferred to a single internal buffer.

FIG. 22 schematically shows how data is transferred to a single internal buffer in read mode 6. The topmost part of FIG. 22 shows a reference picture 711 in MBAFF mode and the arrangement of its motion vectors. The motion vectors corresponding to each macroblock pair are stored in two successive memory areas selected from among a plurality of memory areas 320-1 to 320-N provided in the external memory 320. They are stored as a variable-length data object as in the case described in FIG. 21.

The data written in such a manner is transferred from two successive memory areas (320-1 and 320-2 in the present example) to the first internal buffer 341 by generating consecutive addresses to read out motion vectors corresponding to a macroblock pair line. The resulting state of the first and second internal buffers 341 and 342 is shown in the bottommost part of FIG. 22. Notice, that the second internal buffer 342 contains no data. In such a case, only the first header information parser 353 operates to read header information from the first internal buffer 341 and inform the first read address generator 351 of the number of block partitions. The first internal buffer 341 thus outputs as many motion vectors as the number of block partitions. This enables the motion vector calculator 310 to perform direct mode prediction with a series of motion vectors of, for example, a pair of basic macroblocks 712 and 713 in the reference picture 711.

Figure 23A:
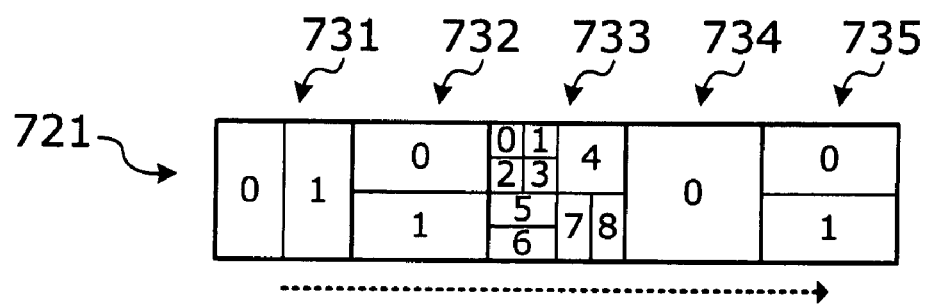
FIGS. 23A and 23B show example block configurations of a macroblock line for explanation of a data read session.
Figure 23B:
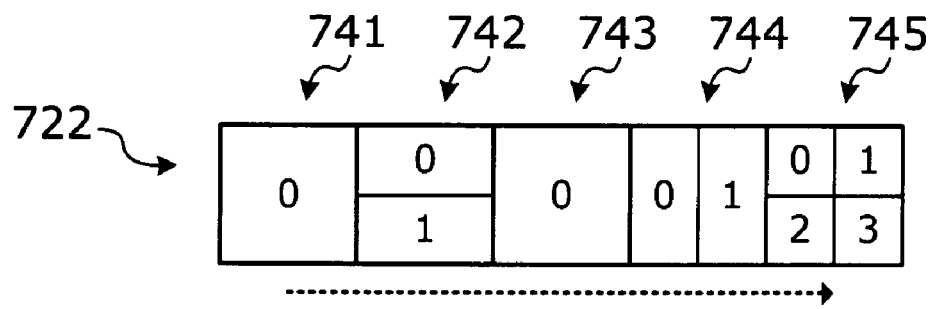

A more specific example of read mode 1 using two internal buffers 341 and 342 will be described below. FIGS. 23A and 23B show two example macroblock lines 721 and 722 for explanation of a data read session. Suppose that the motion vector data of those macroblock lines 721 and 722 are stored in two adjacent memory areas in the external memory 320. More specifically, the macroblock line 721 of FIG. 23A is formed from five basic macroblocks 731 to 735. Likewise, the macroblock line 722 of FIG. 23B is formed from five basic macroblocks 741 to 745. Those two macroblock lines 721 and 722 are quite dissimilar to each other, from top to tail, in terms of the number of block partitions and the size of each block.

Figure 24:
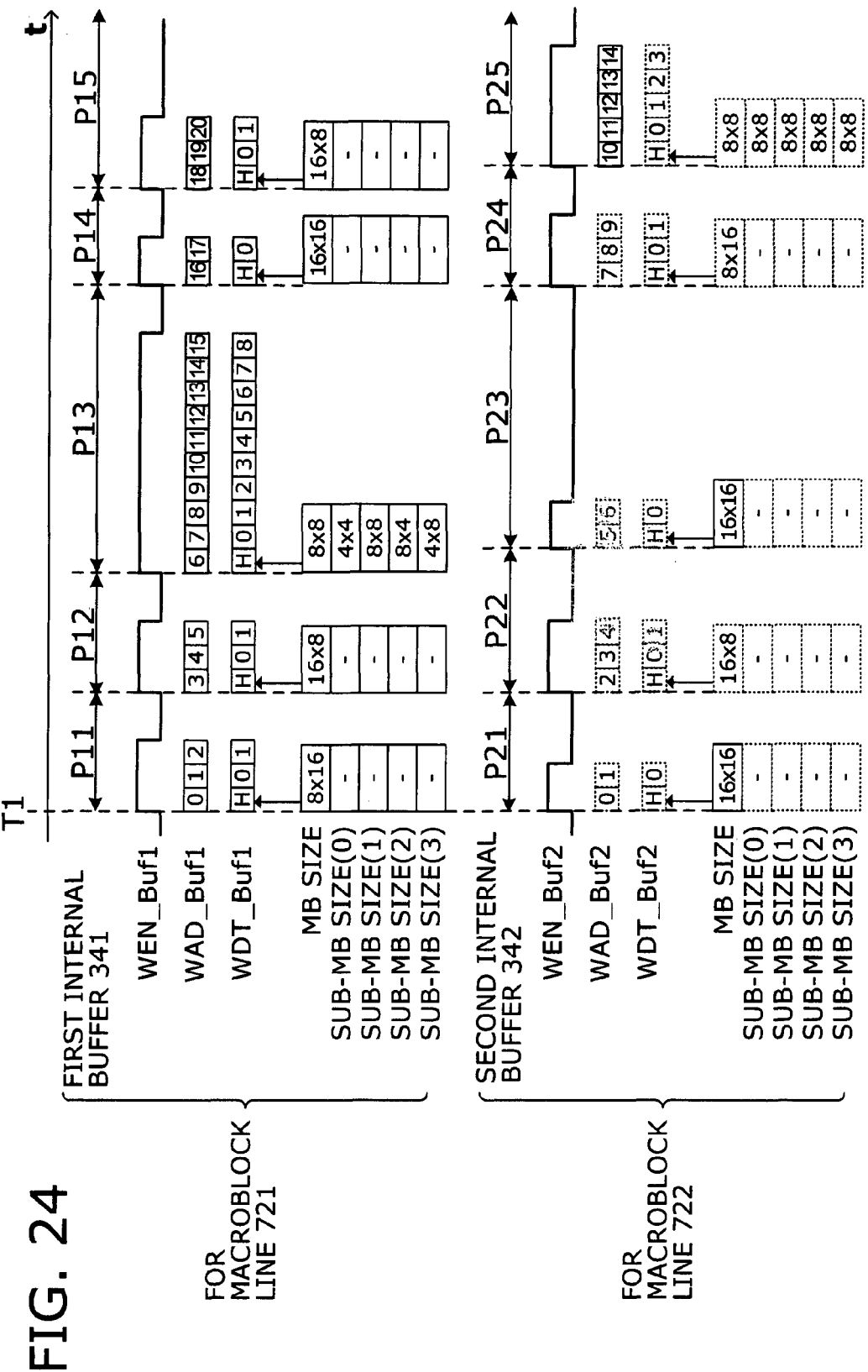
FIG. 24 is a timing diagram showing how data of adjacent macroblock lines are stored in two internal buffers.

FIG. 24 is a timing diagram showing how the data of the adjacent macroblock lines shown in FIGS. 23A and 23B are stored in two internal buffers. In this FIG. 24, WEN_Buf1 and WEN_Buf2 represent write enable signals for the first and second internal buffers 341 and 342, respectively. WAD_Buf1 and WAD_Buf2 are write address for the first and second internal buffers 341 and 342, respectively. WDT_Buf1 and WDT_Buf2 are write data for the first and second internal buffers 341 and 342, respectively.

The example of FIG. 24 assumes that the data of macroblock lines 721 and 722 shown in FIGS. 23A and 23B is transferred respectively to the first and second internal buffers 341 and 342 in a parallel fashion. The foregoing vector write controller 330 has written motion vectors of co-located macroblocks in the external memory 320, together with a preceding header information field. The header information includes parameters named "macroblock partition size" (MB SIZE) and "sub-macroblock partition size" (SUB-MB SIZE). The macroblock partition size parameter indicates the size of blocks constituting a macroblock. The minimum size of such blocks is 8×8. The sub-macroblock partition size parameter, on the other hand, indicates the size of sub-partitions of an 8×8 macroblock. Suffixes (0) to (3) are added to show the positions of 8×8 macroblocks within a 16×16 basic macroblock. Parameters SUB-MB SIZE(0) to SUB-MB SIZE(3) are produced only when the macroblock partition size is 8×8.

The present slice begins with the top portion of macroblock lines 721 and 722. A data read session for those two lines starts simultaneously at time T1. In subsequent periods P11 to P15, header information and motion vectors of co-located macroblocks 731 to 735 in the macroblock line 721 are transferred to the first internal buffer 341. Also, in periods P21 to P25, header information and motion vectors of co-located macroblocks 741 to 745 in the macroblock line 722 are transferred to the second internal buffer 342.

Figure 25:
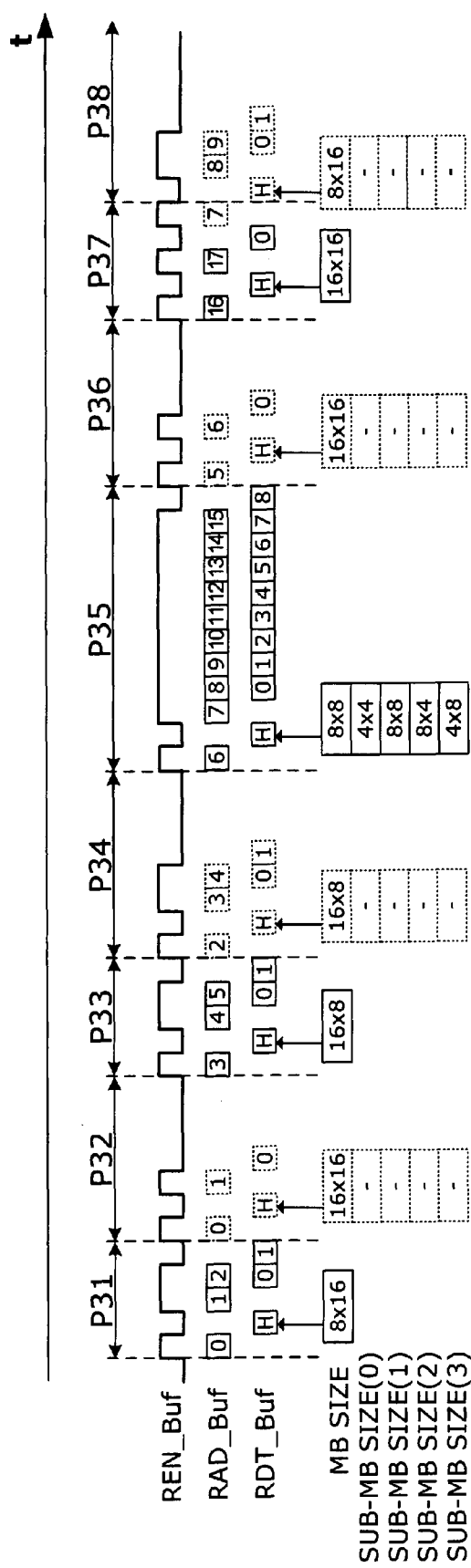
FIG. 25 is a timing diagram showing a process of reading data from two internal buffers.

FIG. 25 is a timing diagram showing a process of reading data from two internal buffers 341 and 342. In this FIG. 25, REN_Buf1 and REN_Buf2 represent read enable signals for the first and second internal buffers 341 and 342, respectively. RAD_Buf1 and RAD_Buf2 are read address signals for the first and second internal buffers 341 and 342, respectively. RDT_Buf1 and RDT_Buf2 represent read data from the first and second internal buffers 341 and 342, respectively.

Periods P31, P33, P35, and P37 are when the first internal buffer 341 outputs data, and periods P32, P34, P36, and P38 are when the second internal buffer 342 outputs data. Each period begins with a first phase where the first header information parser 353 or second header information parser 354 reads header information. This is followed by a second phase where motion vectors for one co-located macroblock are read out from a series of read addresses generated for as many block partitions as specified in the header information.

In the example of FIG. 25, the first and second header information parsers 353 and 354 alternately receive header information from the first and second internal buffers 341 and 342. The header information is used to read motion vectors in a serial fashion for each pair of vertically adjacent co-located macroblocks (e.g., macroblocks 731 and 741, macroblocks 732 and 742 in FIGS. 23A and 23B).

It should be noted that the present invention is not limited to the operation illustrated in FIG. 25. As an alternative embodiment, the first and second internal buffers 341 and 342 may be designed to provide header information of a macroblock pair to their corresponding header information parsers 353 and 354, as well as motion vectors to the corresponding co-located vector buffers 355 and 356, concurrently. Each time a data read session for one co-located macroblock is finished, the first and second header information parsers 353 and 354 take in header information of the next macroblock.

As can be seen from the above, the present embodiment reads data of co-located macroblocks from an external memory 320 for direct-mode motion vector prediction, according to the combination of coding types, frame/field types, and the number of block partitions of current and reference pictures. The present embodiment employs a table to manage such combinations and choose an appropriate read method for a given combination. The present embodiment is also designed to divide the external memory, 320 into a plurality of fixed-length areas to store data of a reference picture on a macroblock line basis, or on a macroblock pair line basis. Further, the present embodiment has two internal buffers 341 and 342 as temporary storage for the data read out of the external memory 320. The foregoing functions can therefore be implemented with a relatively simple circuit structure. Particularly, the present embodiment is advantageous for direct mode operation in the case where the reference picture and current picture differ from each other in terms of frame/field type, or in the case where they are specified as MBAFF pictures.

Another advantage of the present embodiment is its reduced read and write access to the external memory 320 in terms of frequency and duration. This is achieved by storing reference motion vectors only of the original co-located macroblocks without duplicating calculated motion vectors for minimum-sized blocks of 4×4 pixels. While motion vectors for a macroblock line or macroblock pair line are stored as variable-length data, the present embodiment enables sequential access to such data with reduced time and power consumption. The amount of coded data will be reduced as a result of reduction in the number of motion vectors that have to be read. The present embodiment thus makes it possible to compress video data more efficiently, without sacrificing quality of pictures.

Slice Type Switching

The present embodiment makes it easy to handle movement of the current focus on macroblocks since desired co-located macroblock can be retrieved without fail. Also, the above-described structure of the present embodiment supports slice type switching in the middle of a picture. The present embodiment further supports selection of a new reference picture that may happen at the boundary between different slice types.

Figure 26:
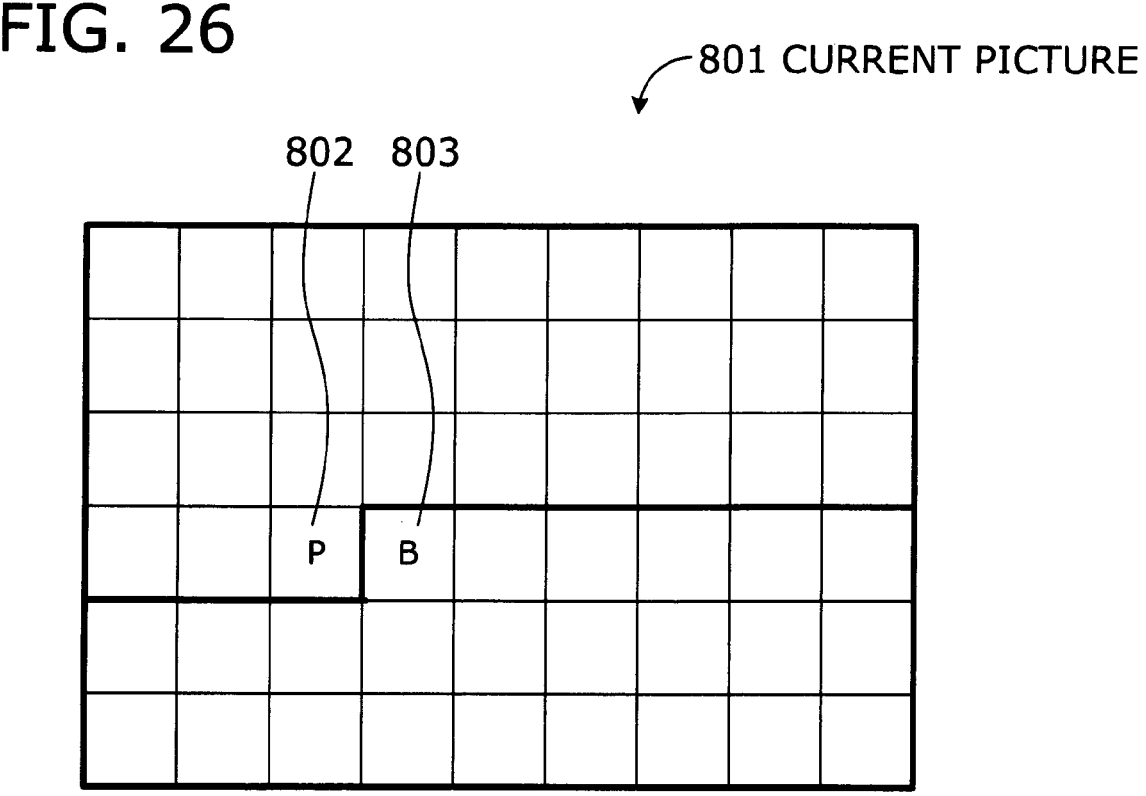
FIG. 26 shows a change in slice type in the middle of a picture.

H.264 allows slice type to change in the middle of a picture. FIG. 26 shows an example where the slice type is switched from P to B at the boundary between macroblocks 802 and 803. The present embodiment stores data of a reference picture in the external memory 320 in the way described in earlier sections. While direct mode may be specified to the macroblock 803, every required reference motion vector can be retrieved easily from the co-located macroblock in the reference picture. Specifically, the present embodiment is designed to read out reference motion vectors from the external memory 320 on a macroblock line basis, or on a macroblock pair line basis, thus naturally beginning to process each slice with the topmost co-located macroblock of a new macroblock line, without the need for additional processing at the boundary of slice types.

Figure 27A:
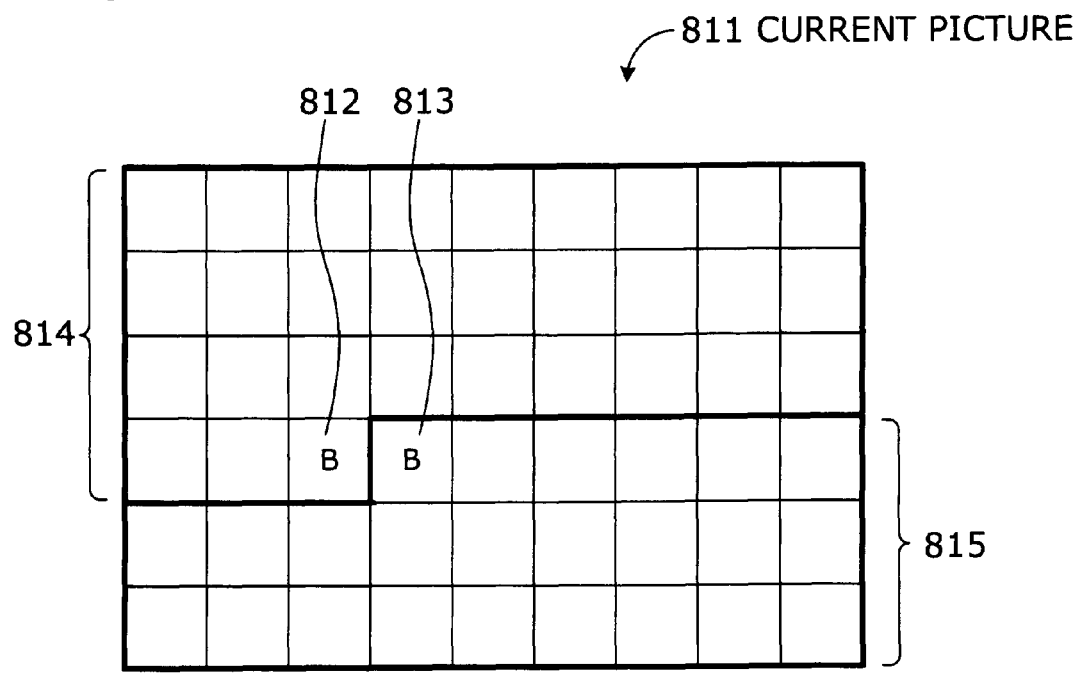
FIGS. 27A and 27B show the case where a new reference picture is selected at the boundary of slices.
Figure 27B:
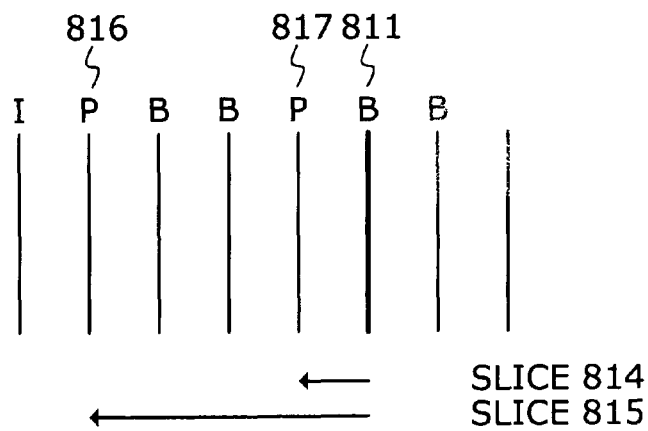

H.264 also allows reference pictures to be changed at the boundary of slices. FIGS. 27A and 27B show an example of such a change. Specifically, FIG. 27A shows a current picture 811 containing B slices 814 and 815 whose boundary lies between macroblocks 812 and 813. FIG. 27B, on the other hand, shows relationships between a current picture 811 and its reference pictures 816 and 817 used around the slice boundary. Specifically, the upper slice 814 containing a macroblock 812 is coded with reference to a preceding picture 816, whereas the lower slice 815 containing a macroblock 813 is coded with reference to another preceding picture 817.

The external memory 320 can store the motion vectors of both pictures 816 and 817 for later reference in the same way as described above, thus providing co-located motion vectors of different reference pictures.

Partition Size Management

This section describes what the partition size manager 360 does. FIG. 28 shows a macroblock type lookup table. The leftmost three data fields of the illustrated macroblock type lookup table 382 are: "MBColMode," "Current Macroblock," and "Co-located Macroblock." The first field MBColMode classifies the combinations of frame/field mode of current macroblock and co-located macroblock. For each MBColMode, the fourth column of the table 382 gives specific co-located macroblock types ("MBCol_MBTYPE" field), together with corresponding current macroblock types ("CurrMB_MBTYPE" field).

The partition size manager 360 consults this read mode decision table 381 to find possible MBColMode corresponding to a given combination of coding type and frame/field mode of the current picture and reference picture. After that, each time a new macroblock in the current picture is selected for processing, the partition size manager 360 decides MBColMode from the combination of the frame/field mode of a new co-located macroblock corresponding to the new current macroblock and the line type of the current picture by consulting again the macroblock type lookup table 382. The partition size manager 360 further uses the macroblock type lookup table 382 to determine CurrMB_MBTYPE from MBCol_MBTYPE relevant to the co-located macroblock, thus choosing necessary motion vectors out of those supplied from the vector read controller 350. The motion vectors chosen in this way are sent to the direct motion vector calculator 311.

The macroblock type lookup table 382 of FIG. 28 has an additional field named "CONSOLIDATE" for explanatory purposes. This field indicates whether the number of block partitions in the current macroblock can be smaller than that in the co-located macroblock. As will be described later, the number of direct-mode motion vectors (and thus the amount of coded data) will be reduced if the block consolidation can be applied to the current macroblock. This function enables a coder to improve the video compression ratio without degrading picture quality. It also enables a decoder to alleviate the processing load of motion vector calculation and motion compensation without degrading picture quality.

Referring now to FIGS. 29 to 32, the following will give some specifics about how the macroblock type of a current macroblock is determined from that of its co-located macroblock. Various types of co-located macroblocks (MBCol) are shown on the right-hand side of each figure, and their corresponding types of current macroblocks (CurrMB) are shown on the left-hand side. The topmost pattern of macroblock type combination is the case where both the current and co-located macroblocks are partitioned into minimum-sized blocks, which is actually the same as what is shown in FIGS. 8A to 9C. As in FIGS. 8A to 9C, block numbers are attached to individual blocks to indicate that motion vectors for each block of the current macroblock can be derived from its corresponding, same-numbered block of the co-located macroblock.

Figure 29:
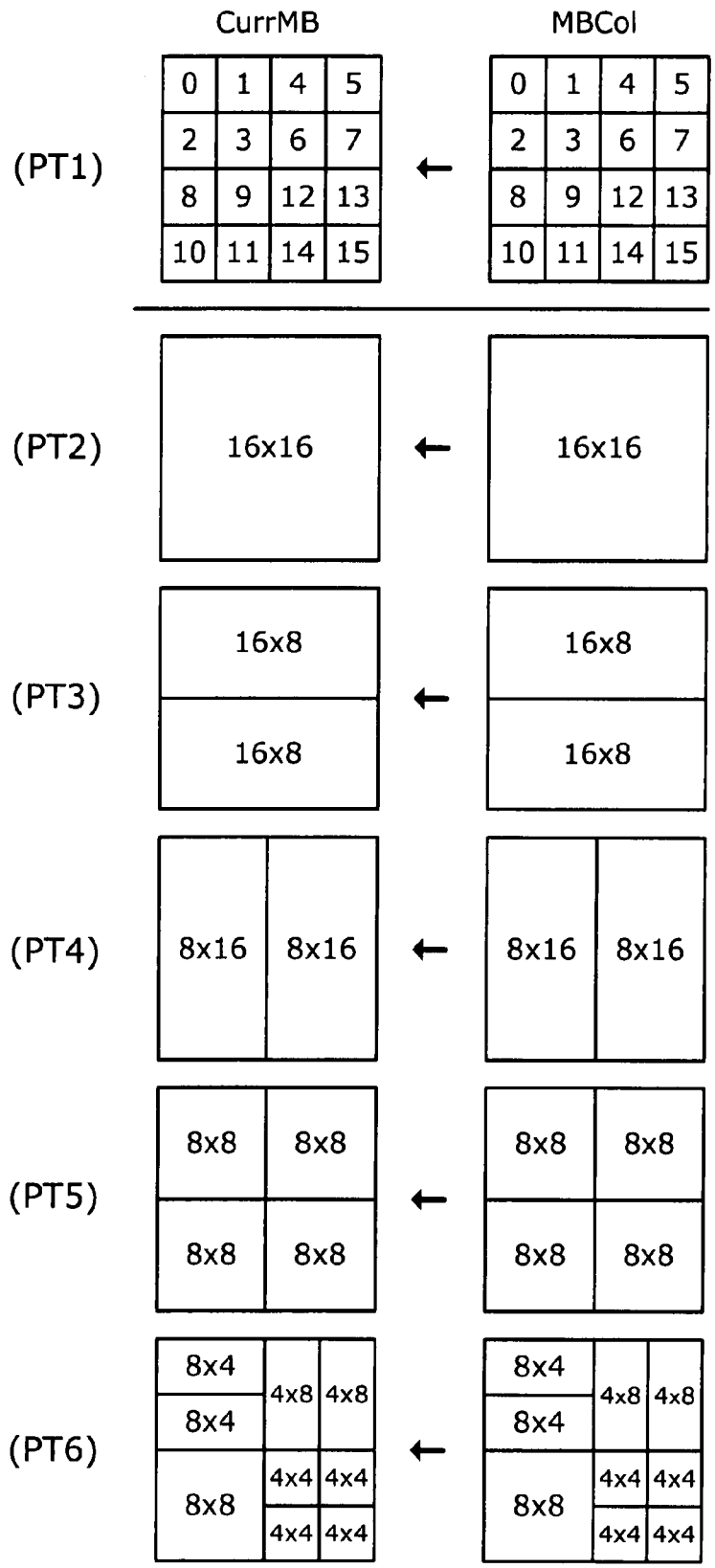
FIG. 29 shows an example of current macroblock type for MBColMode=0.
Figure 33:
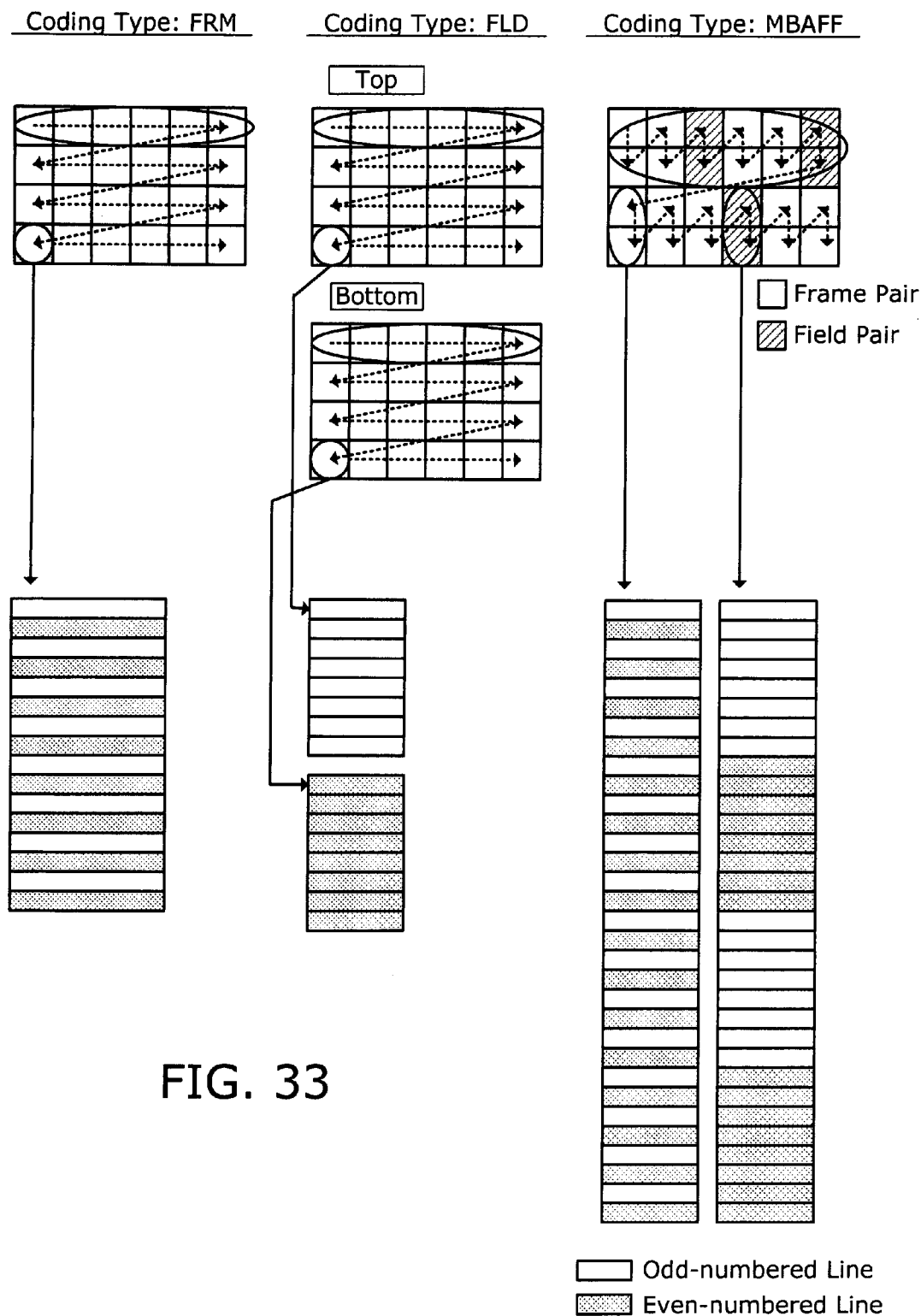
FIG. 33 explains the order of macroblocks to be processed for each different coding type.
Figure 34A:
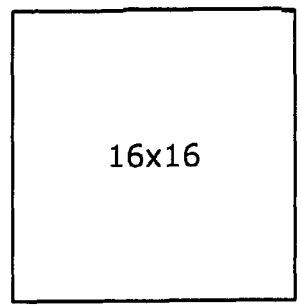
FIGS. 34A to 34E show various sizes of macroblocks and sub-macroblocks defined in H.264.
Figure 34B:
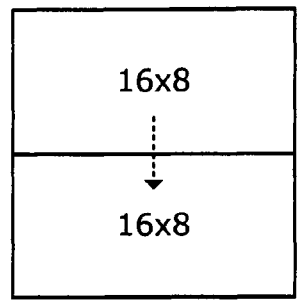
Figure 34C:
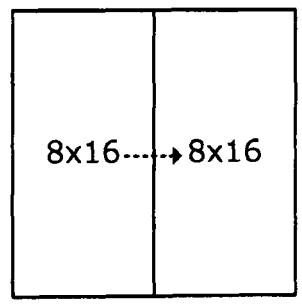
Figure 34D:
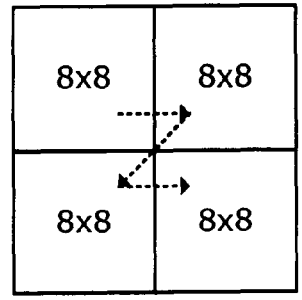
Figure 34E:
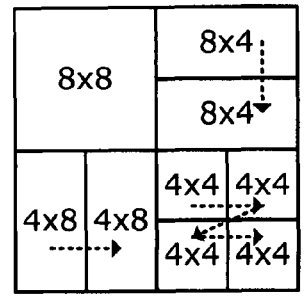
Figure 35:
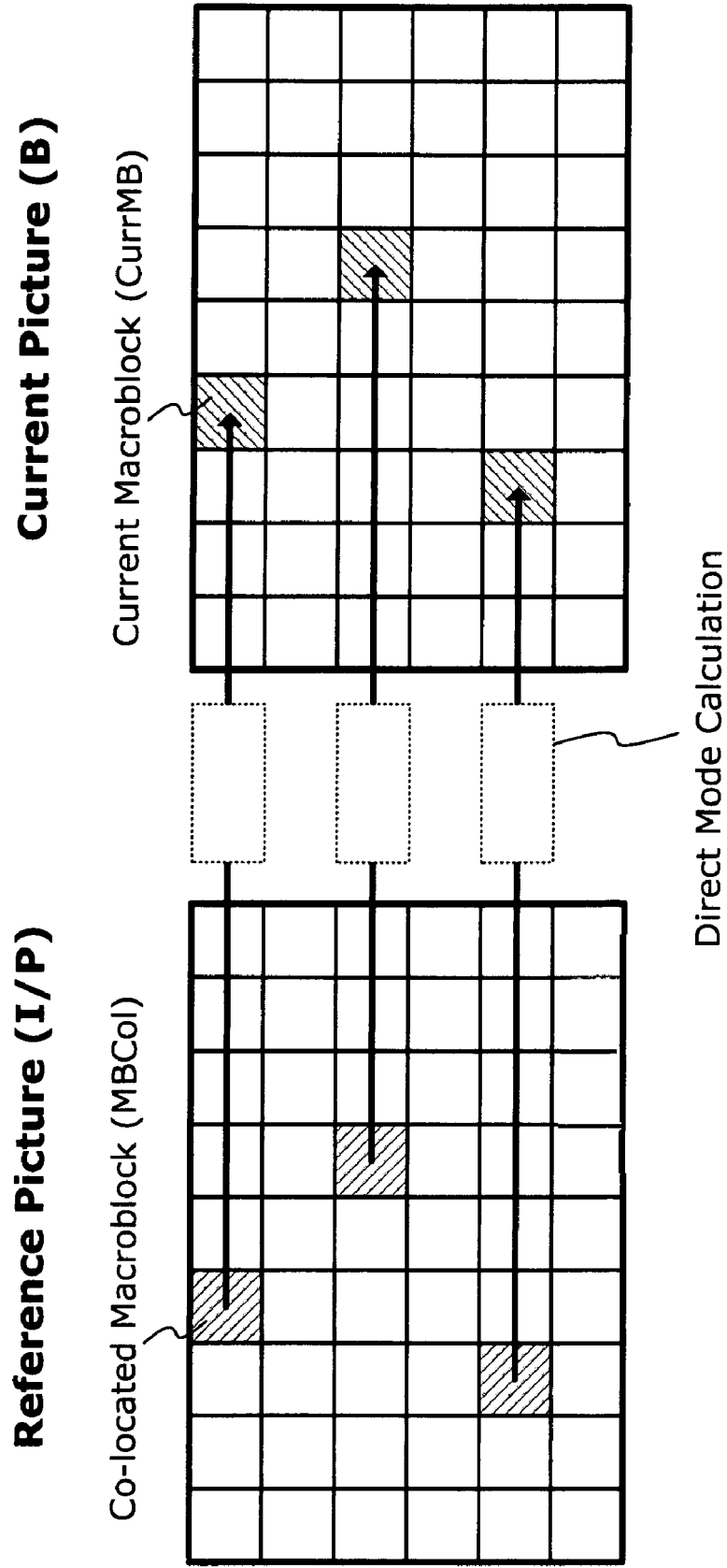
FIG. 35 shows the concept of motion vector calculation in direct mode.

FIG. 29 shows an example of current macroblock type for MBColMode=0. MBColMode=0 means that both the current and co-located macroblocks are in frame form (and their picture coding types are FRM). In this case, motion vectors for each block of the current macroblock are derived directly from a previously calculated motion vector of the co-located block. Accordingly, in MBColMode=0, the current macroblock is given the same macroblock type as the co-located macroblock as shown in PT1 to PT6 of FIG. 29.

FIG. 30 gives an example of current macroblock type for MBColMode=1. MBColMode=1 means that, as described earlier in FIG. 8B, the co-located macroblock may be partitioned into 4×4 blocks whereas minimum-sized partitions of the current macroblock are 8×8 blocks because of the standard specifications. Specifically, pattern PT11 of FIG. 30 shows 8×8 macroblock partitions 901 to 904. Their direct-mode motion vectors are calculated with reference only to corresponding sub-macroblocks 905 to 908, respectively. That is, pattern PT11 permits the upper-left group of four sub-macroblocks in the co-located macroblock to be consolidated into one 8×8 macroblock 901 when they are mapped on the current macroblock. Likewise, the other groups of upper-right, lower-left, and lower-right sub-macroblocks can be consolidated into three 8×8 macroblocks 902, 903, and 904, respectively.

Based on the concept of pattern PT11, none of the next four patterns PT12 to PT15 shown in FIG. 30 allows block consolidation since the minimum-sized blocks of those types of co-located macroblocks are as large as 8×8 pixels. The current macroblock of those patterns PT12 to PT15 will thus be given the same macroblock type as the co-located macroblock. On the other hand, the bottommost pattern PT16 in FIG. 30 involves smaller partitions (4×4, 4×8, and 8×4 sub-macroblocks) as part of co-located macroblock. In this case, some of those sub-macroblocks will be consolidated into 8×8 form when they are mapped on the current macroblock. For example, sub-macroblocks 909 and 910 can be consolidated into a single 8×8 macroblock 911, so that the motion vector for this macroblock 911 will be directly derived from that of the sub-macroblock 910. That is, the partition size manager 360 chooses 8×8 for the current macroblock type corresponding to those co-located sub-macroblocks 909 and 910 and thus sends the motion vector of the sub-macroblock 910 to the direct motion vector calculator 311, together with that macroblock type information.

FIG. 31 shows an example of current macroblock type for MBColMode=2 or =3. Referring to pattern PT21 of FIG. 31, the same single co-located macroblock is depicted as two macroblocks; the left one is used to process odd-numbered lines of the current macroblock in the case of MBColMode=2, and the right one is used to process even-numbered lines of the current macroblock in the case of MBColMode=3. When MBColMode=2 or =3, the minimum block size is 4×4 for co-located macroblocks whereas that for current macroblocks is 8×8, as in pattern PT21.

In the case of MBColMode=2, motion vectors for odd-numbered lines of four current macroblocks 911 to 914 are derived from co-located sub-macroblocks 915 to 918, respectively, as discussed in FIG. 9A. In the case of MBColMode=3, motion vectors for even-numbered lines of four current macroblocks 911 to 914 are derived from co-located sub-macroblocks 919 to 922, respectively, as discussed in FIG. 9B. This means that the leftmost two co-located sub-macroblocks on the first row and those on the third row are mapped onto a single consolidated current macroblock 911 with a size of 8×8. Likewise, the rightmost two co-located sub-macroblocks on the first row and those on the third row are mapped onto a single consolidated current macroblock 912. The leftmost two co-located sub-macroblocks on the second row and those on the fourth row are mapped onto a single consolidated current macroblock 913. The rightmost two co-located sub-macroblocks on the second row and those on the fourth row are mapped onto a single consolidated current macroblock 914.

Applying the concept of pattern PT21 to the subsequent three patterns PT23 to PT25 shown in FIG. 31, there will be no need for their current macroblock to have vertical partitioning if neither the upper nor the lower 16×8 block of their co-located macroblock is vertically partitioned into sub-macroblocks. This condition is true for patterns PT23 to PT25 in FIG. 31, and two patters PT23 and PT25 enjoy vertical consolidation of blocks.

In the bottommost pattern PT26, on the other hand, the co-located macroblock includes vertical sub-partitioning in its upper half, as well as in its lower half. The current macroblock should therefore be partitioned into 8×8 macroblocks. Think of those 8×8 macroblocks 923 and 924, for example. The partition size manager 360 helps the direct motion vector calculator 311 calculate motion vectors for those macroblocks by supplying it with motion vectors of sub-macroblock 925 for odd-numbered lines and of sub-macroblocks 926 and 927 for even-numbered lines.

Referring to pattern PT22, the co-located macroblock undergoes no partitioning. Accordingly the 16×16 current macroblock maintains its original single-piece structure.

FIG. 32 shows an example of current macroblock type for MBColMode=4. As can be seen in pattern PT31, the minimum possible block size in the case of MBColMode=4 is 4×4 for co-located macroblocks whereas that for current macroblock is 8×8. In this pattern PT31, the co-located macroblock and current macroblock are associated in the way shown in FIG. 9C. To calculate motion vectors for top and bottom fields of such current macroblock, it is necessary to make reference to two vertically adjacent macroblocks in the reference picture as co-located macroblocks. The macroblock type lookup table 382 of FIG. 28 gives information about this in MBCoLMode=4. Specifically, the column for MBCol_MB-TYPE field includes an entry describing "Upper MBCol" and "Lower MBCol." That entry refers to two vertically adjacent partitions of a co-located macroblock.

Referring back to FIG. 32, the partition size manager 360 accordingly supplies the direct motion vector calculator 311 with motion vectors of co-located sub-macroblocks 935 and 936 for direct-mode vector prediction for the upper two current macroblock partitions 931 and 932. It also provides motion vectors of co-located sub-macroblocks 937 and 938 for direct-mode vector prediction for the lower two current macroblock partitions 933 and 934.

Based on the concept of pattern PT31, both the next two patterns PT32 and PT33 shown in FIG. 30 will allow block consolidation if their co-located macroblock has no sub-macroblock partitions of 8×8 or smaller in its upper and lower halves. Specifically, the current macroblock in pattern PT32 is formed as a vertically adjacent pair of 16×8 macroblocks, each of which may be a result of consolidation of two co-located macroblocks. In other cases than the above, the current macroblock will be partitioned into four 8×8 macroblocks as shown in pattern PT33.

As can be seen from the above explanation, the partition size manager 360 of the present embodiment determines the partition size of a macroblock in the current picture according to the macroblock type of its corresponding co-located macroblock, so as to maximize the partitions of the current macroblock as much as possible. With maximized partitions, a minimum number of co-located motion vectors are selected and subjected to direct-mode vector prediction for the current macroblock partitions. The reduction in the number of such motion vectors used in the direct-mode prediction also means reduced access to reference picture memory for motion compensation, thus relaxing requirements for the memory bandwidth. The resulting advantages include lighter processing loads, smaller power consumption, and reduced manufacturing costs of coder/decoder circuits. The present embodiment achieves this without sacrificing the accuracy of motion compensation. In video coding applications, the present embodiment reduces the amount of coded data (or, in other words, improves video compression ratios) without degrading picture quality.

The conventional techniques can only combine 4×4 blocks to 8×8 macroblocks since they store motion vectors calculated for a macroblock in an external memory by mapping them onto uniformly sized (4×4) blocks, as in patterns PT1, PT11, PT21, and PT31 of FIGS. 29 to 32. By contrast, according to the present embodiment, the co-located macroblock maintains its original macroblock type when it is subjected to the partition size manager 360, thus making it possible to divide the current macroblock into blocks larger than 8×8 pixels. The present embodiment therefore reduces the number of motion vectors calculated in direct mode. In addition, the processing burden on the partition size manager 360 to determine the macroblock type can be alleviated since the partition size manager 360 receives a fewer number of co-located motion vectors, relative to the case of conventional uniform 4×4 partitions. This will also contribute to reduction of power consumption.

The above-described embodiment stores motion vectors of a reference picture in an external memory 320 that is employed as a separate component from the interframe predictor 210 (or video decoding device 200). However, the present invention is not limited to that configuration of external memory. The memory may be implemented as an integral part of the interframe predictor 210 or video decoding device 200. The first and second internal buffers 341 and 342 may, in turn, be implemented as external components. Furthermore, the external memory 320 and the first and second internal buffers 341 and 342 may be implemented on a single memory subsystem. The above variations are applicable not only to the interframe predictor 210 of the video decoding device 200 (FIG. 3), but also to the interframe predictor 104 of the video coding device 100 (FIG. 2).

Computer-Readable Medium

The above-described processing mechanisms of the proposed motion prediction processor are actually implemented on a computer system. The computer instructions for the foregoing video coder and decoder are encoded in the form of computer programs. A computer system executes those programs to provide the intended functions of the present invention. For the purpose of storage and distribution, those programs may be stored in a computer-readable storage medium. Suitable computer-readable storage media include magnetic storage media, optical discs, magneto-optical storage media, and solid state memory devices.

Portable storage media, such as DVD and CD-ROM, are suitable for distribution of program products. Network-based distribution of software programs may also be possible, in which case several master program files are made available on a server computer for downloading to other computers via a network.

A user computer stores necessary software components in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

According to the present invention, the motion prediction processor uses a vector memory providing a plurality of memory areas corresponding to multiple block lines of a reference picture. The proposed motion prediction processor is designed to write and read only a limited number of reference motion vectors in the vector memory on an individual block line basis to minimize access to the vector memory. The stored motion vectors are read out in a manner determined according to whether the current picture is a frame picture or a field picture, whether the reference picture is a frame picture or a field picture, and whether block adaptive prediction mode is used in each picture. This feature permits the vector calculator to receive required motion vectors from each buffer, no matter how the current picture and reference picture are organized. The present invention thus expands the applicable range of direct mode motion prediction, as well as alleviating the processing load of motion estimation.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A motion prediction processor that performs interframe motion prediction on a basic block basis, the motion prediction processor being coupled to a vector memory and to first and second buffers organized as first-in first-out data storage, the motion prediction processor comprising:

a write controller that writes, in the vector memory divided into odd-numbered and even-numbered memory areas, motion vectors of top and bottom fields constituting a field picture that is specified as a reference picture in motion prediction of a current picture, in such a way that the motion vectors of block lines constituting the top field and the motion vectors of block lines constituting the bottom field are stored respectively in the odd-numbered and even-numbered memory areas, wherein each block line is formed from a plurality of horizontally aligned basic blocks of the reference picture;

a read controller that transfers the stored motion vectors from the odd-numbered memory areas to the first buffer, in parallel with the stored motion vector from the even-numbered memory areas to the second buffer, when the reference picture is a field picture while the current picture is in block adaptive prediction mode which permits selection of frame prediction or field prediction on an individual basic block basis; and a vector calculator that calculates a motion vector for each basic block of the current picture, based on the motion vectors sequentially read out of the first and second buffers.

2. The motion prediction processor according to claim 1, wherein:

the read controller transfers motion vectors from the odd-numbered memory areas to the first buffer, as well as from the even-numbered memory areas to the second buffer in a parallel fashion, when neither the reference picture nor the current picture is in the block adaptive prediction mode, and when the reference picture is a frame picture while the current picture is a field picture.

3. The motion prediction processor according to claim 1, wherein:
the write controller writes motion vectors alternately to the odd-numbered and even-numbered memory areas corresponding to two vertically adjacent block lines of the reference picture, when the reference picture is in the block adaptive prediction mode; and
the read controller reads out the motion vectors for of each pair of vertically adjacent basic blocks alternately from the odd-numbered and even-numbered memory areas and sequentially enters the read motion vectors only to the first buffer, when the reference picture is in the block adaptive prediction mode.

4. The motion prediction processor according to claim 1, wherein the read controller reads out the motion vectors only from the odd-numbered memory areas assigned to the top field and enters the motion vectors only to the first buffer, when both the reference picture and current picture are field pictures, but not in the block adaptive prediction mode.

5. The motion prediction processor according to claim 1, wherein the read controller reads out each motion vector twice from the odd-numbered memory areas assigned to the top field and enters the motion vectors only to the first buffer, when the reference picture is a field picture, but not in the block adaptive prediction mode, and when the current picture is a frame picture, but not in the block adaptive prediction mode.

6. The motion prediction processor according to claim 1, wherein the read controller comprises a table describing the manner for transferring motion vectors, according to whether the current picture is a frame picture or a field picture, whether the reference picture is a frame picture or a field picture, and whether block adaptive prediction mode is specified or not.

7. The motion prediction processor according to claim 1, wherein the vector calculator receives the stored motion vectors on an individual basic block basis, either alternately from the first and second buffers or solely from the first buffer.

8. The motion prediction processor according to claim 1, further comprising a partition size manager that determines whether to partition a basic block in the current picture either in the same way as a co-located block in the reference picture or in such a way that one partition of the basic block in the current picture will be equal in size with two or more partitions of the co-located block in the reference block picture, depending on combinations of parameters respectively representing;
whether the basic block in the current picture is in frame form or in field form,
whether the co-located block in the reference picture is in frame form or in field form,
whether the current picture is in the block adaptive prediction mode, and
whether the reference picture is in the block adaptive prediction mode.

9. The motion prediction processor according to claim 8, wherein the partition size manager does not apply vertical partitioning to the basic block in the current picture, when neither the current picture nor the reference picture is in the block adaptive prediction mode, and when the basic block in the current picture is in frame form while the co-located block in the reference picture is in field form, and when upper and lower halves of the co-located block in the reference block picture have undergone no further vertical partitioning.

10. The motion prediction processor according to claim 8, wherein the partition size manager partitions the basic block in the current picture into two vertically adjacent half-size blocks, rather than two horizontally adjacent half-size blocks, when neither the current picture nor the reference picture is in the block adaptive prediction mode, and when the basic block in the current picture is in field form while the reference block is in frame form, and when neither of two vertically adjacent basic blocks in the reference picture, one of which is corresponding to the basic block in the current picture, has been partitioned into blocks equal to or smaller than quarter-size blocks.

11. A video coding device that encodes video signals into compressed video data by performing interframe motion prediction on a basic block basis, the video coding device comprising:
a vector memory providing a plurality of memory areas including odd-numbered memory areas and even-numbered memory areas, each configured to store motion vectors of a block line formed from horizontally aligned basic blocks of a reference picture;
first and second buffers organized as first-in first-out data storage;
a write controller that writes, in the vector memory, motion vectors of top and bottom fields constituting a field picture that is specified as the reference picture in motion prediction of a current picture, in such a way that the motion vectors of block lines constituting the top field and the motion vectors of block lines constituting the bottom field are stored respectively in the odd-numbered and even-numbered memory areas;
a read controller that transfers the stored motion vectors from the odd-numbered memory areas to the first buffer, in parallel with the stored motion vector from the even-numbered memory areas to the second buffer, when the reference picture is a field picture while the current picture is in block adaptive prediction mode which permits selection of frame prediction or field prediction on an individual basic block basis; and
a vector calculator that calculates a motion vector for each basic block of the current picture, based on the motion vectors sequentially read out of the first and second buffers.

12. A video decoding device that reconstructs original video pictures from a compressed video signal that has been produced by performing interframe motion prediction on a basic block basis, the video decoding device comprising:
a vector memory providing a plurality of memory areas including odd-numbered memory areas and even-numbered memory areas, each configured to store motion vectors of a block line formed from horizontally aligned basic blocks of a reference picture;
first and second buffers organized as first-in first-out data storage;
a write controller that writes, in the vector memory, motion vectors of top and bottom fields constituting a field picture that is specified as the reference picture in motion prediction of a current picture, in such a way that the motion vectors of block lines constituting the top field and the motion vectors of block lines constituting the bottom field are stored respectively in the odd-numbered and even-numbered memory areas;
a read controller that transfers the stored motion vectors from the odd-numbered memory areas to the first buffer, in parallel with the stored motion vector from the even-numbered memory areas to the second buffer, when the reference picture is a field picture while the current picture is in block adaptive prediction mode which permits selection of frame prediction or field prediction on an individual basic block basis; and a vector calculator that calculates a motion vector for each basic block of the current picture, based on the motion vectors sequentially read out of the first and second buffers.

13. A method of performing interframe motion prediction on a basic block basis, comprising:

dividing a vector memory into a plurality of memory areas including odd-numbered memory areas and even-numbered memory areas, each configured to store motion vectors of a block line formed from horizontally aligned basic blocks of a reference picture;

providing first and second buffers organized as first-in first-out data storage;

writing, in the vector memory, motion vectors of top and bottom fields constituting a field picture that is specified as the reference picture in motion prediction of a current picture, in such a way that the motion vectors of block lines constituting the top field and the motion vectors of block lines constituting the bottom field are stored respectively in the odd-numbered and even-numbered memory areas;

transferring the stored motion vectors from the odd-numbered memory areas to the first buffer, in parallel with the stored motion vector from the even-numbered memory areas to the second buffer, when the reference picture is field picture while the current picture is in block adaptive prediction mode which permits selection of frame prediction or field prediction for each on an individual basic block basis; and calculating a motion vector for each basic block of the current picture, based on the motion vectors sequentially read out of the first and second buffers.

14. A computer-readable, non-transitory medium storing a program for performing interframe motion prediction on a basic block basis, the program causing a computer system to function as:

a vector memory providing a plurality of memory areas including odd-numbered memory areas and even-numbered memory areas, each configured to store motion vectors of a block line formed from horizontally aligned basic blocks of a reference picture;

first and second buffers organized as first-in first-out data storage;

a write controller that writes, in the vector memory, motion vectors of top and bottom fields constituting a field picture that is specified as the reference picture in motion prediction of a current picture, in such a way that the motion vectors of block lines constituting the top field and the motion vectors of block lines constituting the bottom field are stored respectively in the odd-numbered and even-numbered memory areas;

a read controller that transfers the stored motion vectors from the odd-numbered memory areas to the first buffer, in parallel with the stored motion vector from the even-numbered memory areas to the second buffer, when the reference picture is a field picture while the current picture is in block adaptive prediction mode which permits selection of frame prediction or field prediction on an individual basic block basis; and a vector calculator that calculates a motion vector for each basic block of the current picture, based on the motion vectors sequentially read out of the first and second buffers.

\* \* \* \* \*